(12) United States Patent
Takano et al.

(10) Patent No.: US 7,336,396 B2
(45) Date of Patent: Feb. 26, 2008

(54) IMAGE PROCESSING APPARATUS AND IMAGE PROCESSING METHOD

(75) Inventors: Gaku Takano, Yokohama (JP); Naofumi Yamamoto, Kawasaki (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1092 days.

(21) Appl. No.: 10/391,756

(22) Filed: Mar. 20, 2003

(65) Prior Publication Data
US 2005/0073723 A1   Apr. 7, 2005

(51) Int. Cl.
H04N 1/409 (2006.01)
G06T 5/00 (2006.01)
G06K 15/02 (2006.01)

(52) U.S. Cl. ............ 358/2.1; 358/3.26; 358/3.27; 382/199; 382/258; 382/267

(58) Field of Classification Search ............ 358/1.9, 358/462, 448, 2.1, 3.26, 3.27; 382/173–174, 382/190, 193, 202, 252, 176, 199, 258, 267; 355/44
See application file for complete search history.

(56) References Cited

U.S. PATENT DOCUMENTS 6,167,154 A * 12/2000 Renaud et al. ............ 382/174
6,278,513 B1 * 8/2001 Murata et al. ............ 355/44
2002/0025072 A1 * 2/2002 Yamaai .................... 382/199

FOREIGN PATENT DOCUMENTS

JP    3-43879 A      2/1991
JP    2001-243469 A  9/2001

* cited by examiner

Primary Examiner—Kimberly Williams
Assistant Examiner—Charlotte M. Baker
(74) Attorney, Agent, or Firm—Foley & Lardner LLP

(57) ABSTRACT

An image processing apparatus extracts a contour pixel of a binary input image signal in a contour pixel extraction portion, and calculates a line thinning amount from the extracted contour pixel based on a preset parameter in a line thinning amount calculation portion. The apparatus judges whether black pixel areas of the binary input image signal are connected in a finite area including a target pixel in a finite area connectivity judgment portion. The apparatus adds a line thinning amount to the binary input image signal of the target pixel in accordance with the judgment by the finite area connectivity judgment portion and outputs obtained results in a selective correction output portion.

23 Claims, 18 Drawing Sheets

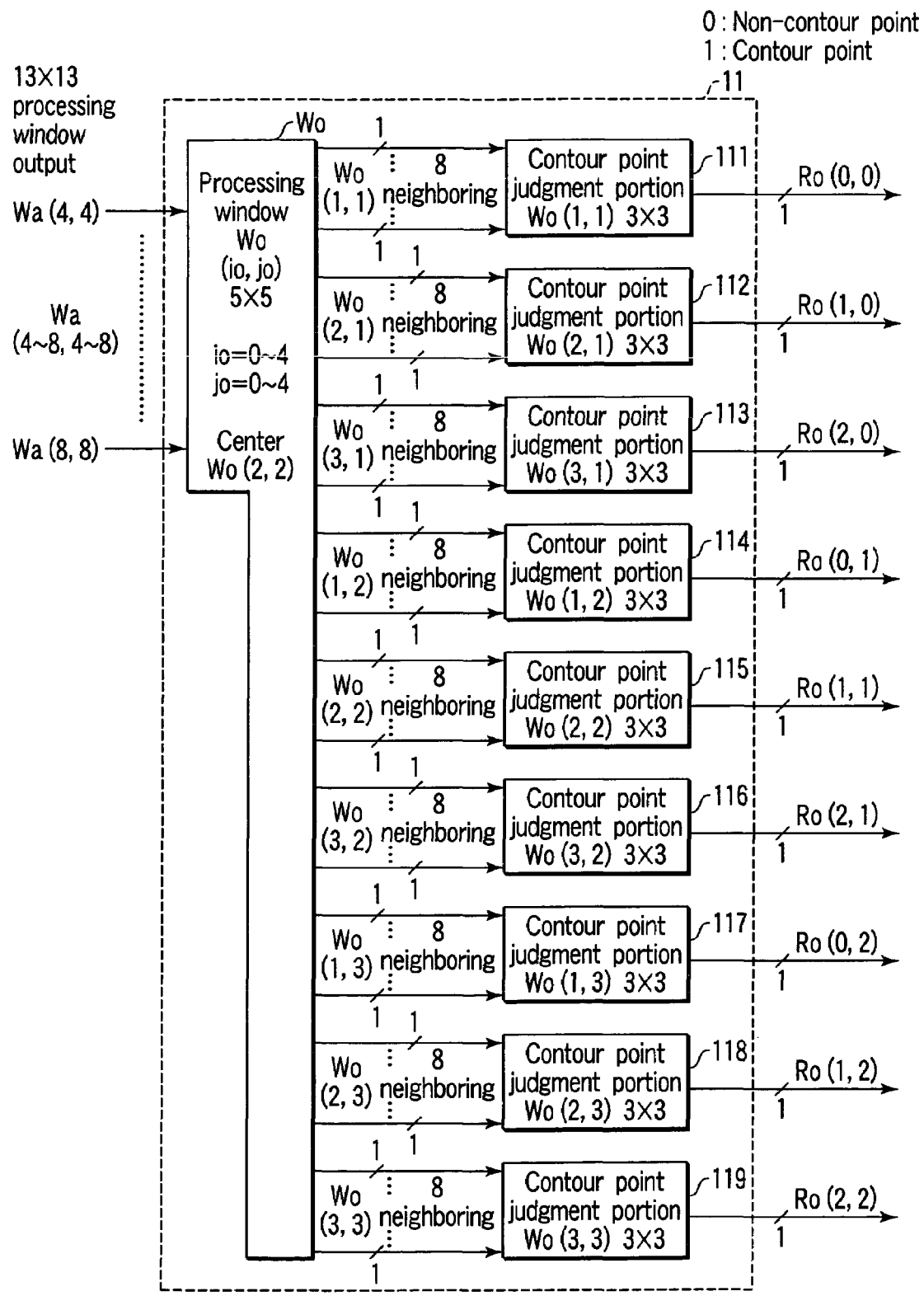
F I G. 4

| b0 | b1 | b2 |
|----|----|----|
| b3 |    | b4 |
| b5 | b6 | b7 |
FIG. 7A
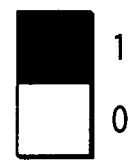
FIG. 7B
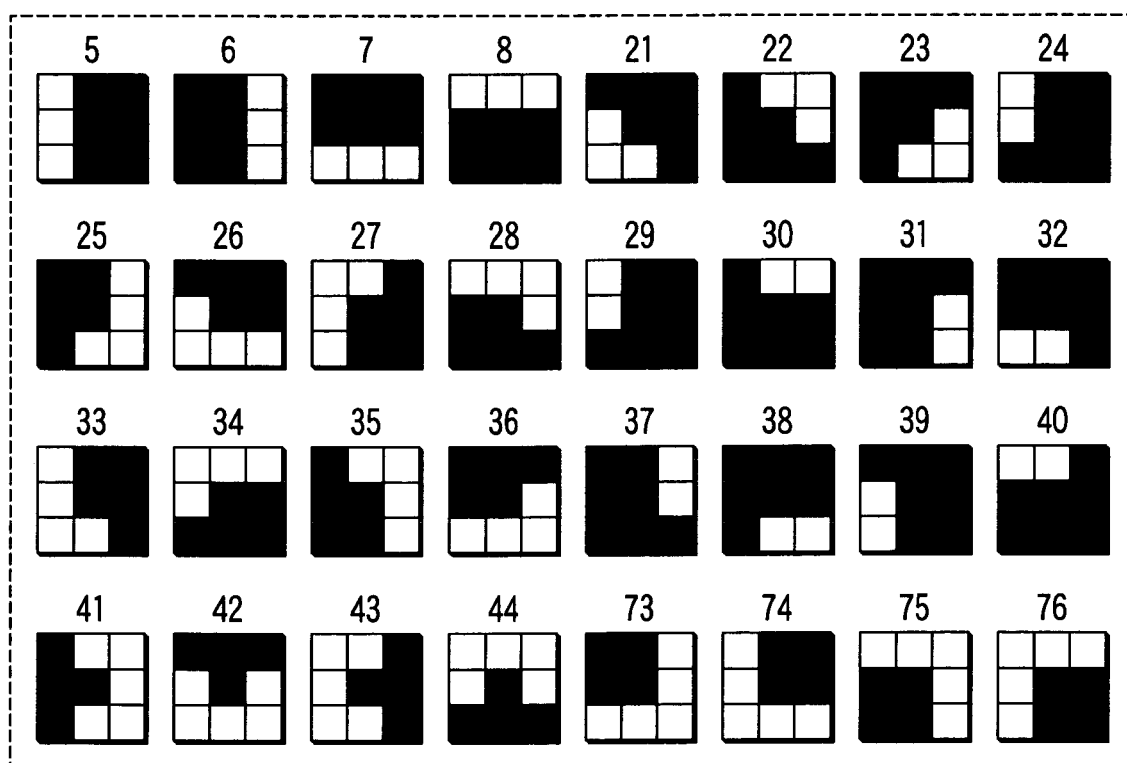
FIG. 7C

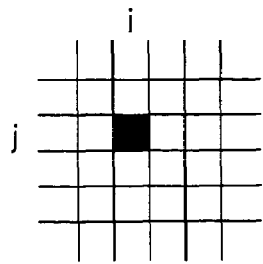
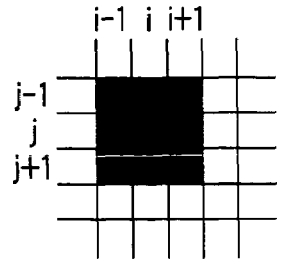
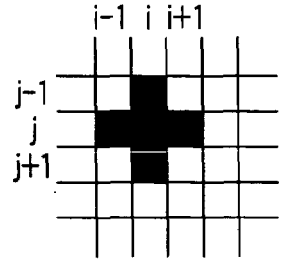
F I G. 9A    F I G. 9B    F I G. 9C
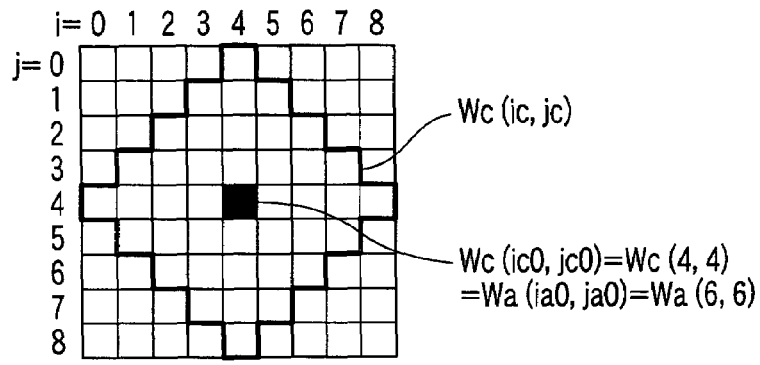
F I G. 10
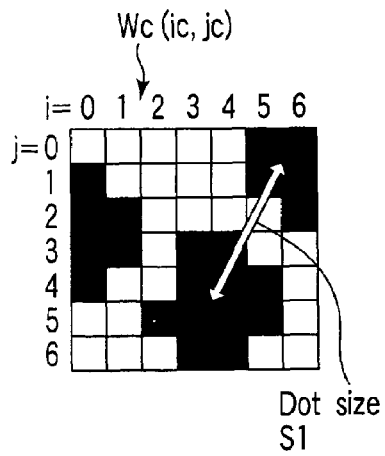
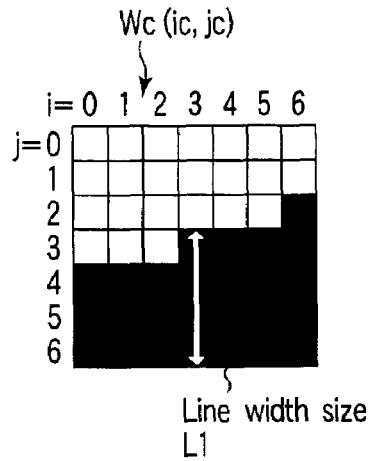
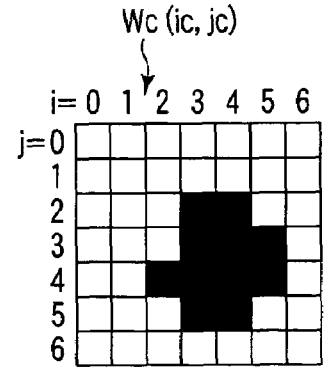
F I G. 11A    F I G. 11B    F I G. 13

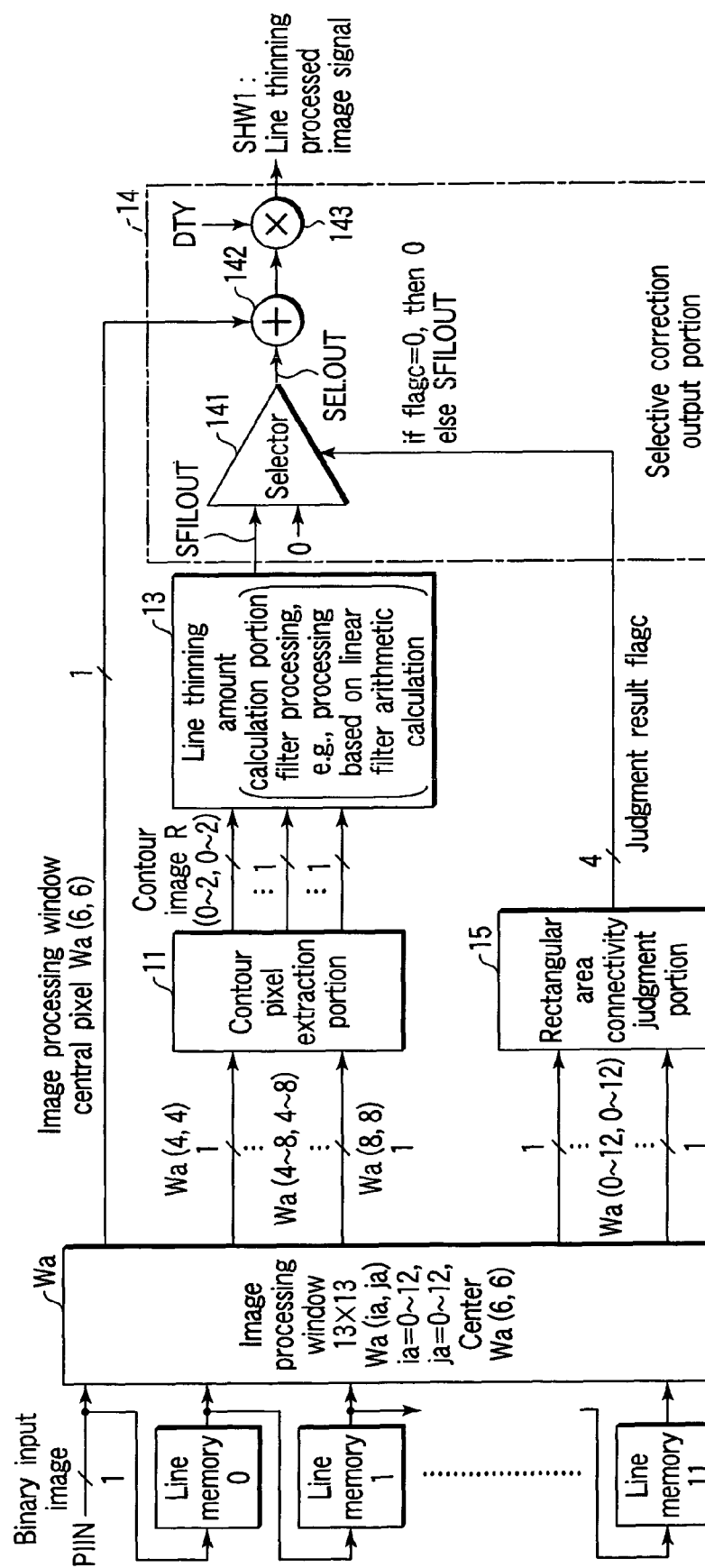
F I G. 14

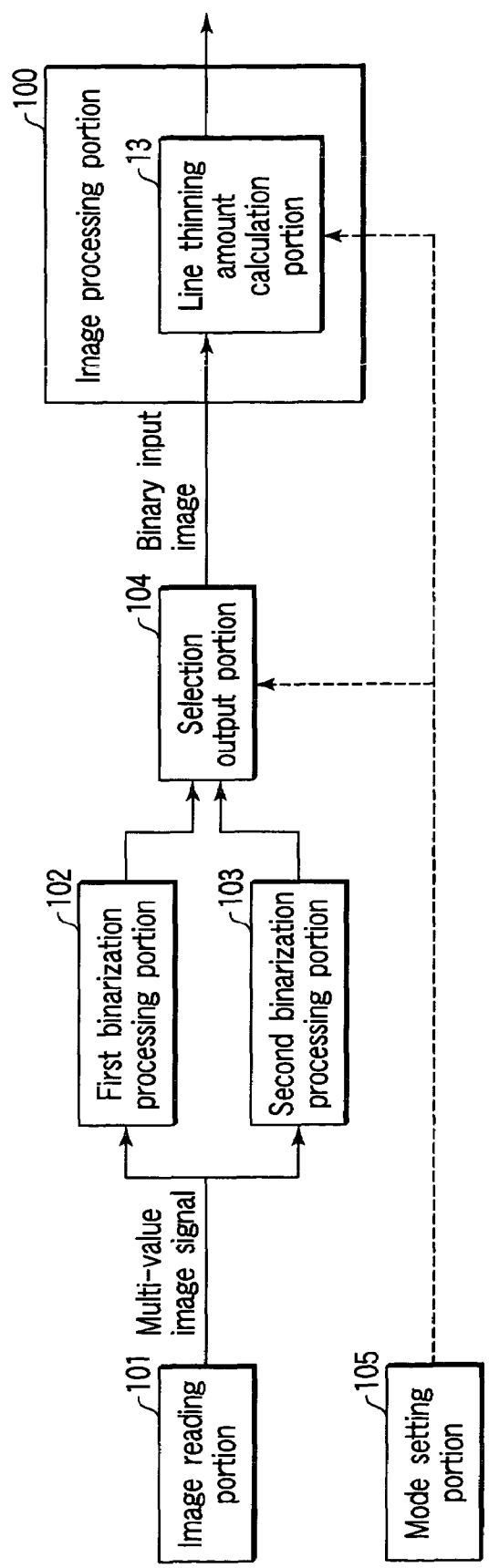
F I G. 24

IMAGE PROCESSING APPARATUS AND IMAGE PROCESSING METHOD

BACKGROUND OF THE INVENTION

1. Field of the Invention

The present invention relates to an image processing apparatus and an image processing method for use in an image forming apparatus, such as a laser printer or a digital copying machine.

2. Description of the Related Art

A conventional image processing apparatus reduces a print area by executing processing to form a contour portion of an image and thin lines. When an image processed in this manner is printed in an image forming apparatus, the consumption of ink member such as toner can be reduced. Therefore, for the purpose of saving the toner, there has been developed a line thinning technique of, e.g., performing pattern replacement or determining a contour pixel as a sample point and forming the contour on the inner side by interpolation, but such a technique is mainly based on a character type document.

When this method is applied to a binary image in which characters and pictures obtained by binarizing a picture area by a gray level processing method such as an organizational dither both exist, a pseudo-contour or the like is generated since the contour of dots expressing a picture is cut off, thereby degrading the gray scale reproduction.

BRIEF SUMMARY OF THE INVENTION

There is a need for an image processing apparatus and an image processing method which thin lines without degrading gray scale reproduction by judging whether in-area black pixels are coupled in a finite area including a target pixel and switching execution or non-execution of line thinning processing in accordance with a result of this judgment.

According to an aspect of the present invention, there is provided an image processing apparatus comprising: a contour pixel extraction portion which extracts a contour pixel of a binary input image signal; a line thinning amount calculation portion which calculates a line thinning amount from the extracted contour pixel based on a preset parameter; a connectivity judgment portion which judges whether black pixel areas of the binary input image signal are connected in a finite area including a target pixel; and a selective correction output portion which adds a line thinning amount to the binary input image signal of the target pixel in accordance with a judgment of the finite area connectivity judgment portion and outputs a result.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a view showing a schematic structure of a contour image extraction portion;

FIG. 7A is a view showing an arrangement of signals in a contour point judgment table;

FIG. 7B is a view showing "1" as a black pixel and "0" as a white pixel;

FIG. 7C is a view showing contour patterns;

FIG. 9A is a view showing a black pixel;

FIG. 9B is a view showing an 8-neighboring enlargement processing of the black pixel;

FIG. 9C is a view showing a 4-neighboring enlargement processing of the black pixel;

FIG. 10 is a view showing an example of the processing window;

FIG. 11A is a view showing an example that black pixel areas are not connected;

FIG. 11B is a view showing an example that black pixel area are connected;

FIG. 13 is a view showing an example that a black pixel area is an isolated point;

FIG. 14 is a schematic block diagram showing an image processing apparatus according to a third embodiment;

FIG. 24 is a schematic block diagram showing an image processing apparatus according to a seventh embodiment.

DETAILED DESCRIPTION OF THE INVENTION

Each embodiment according to the present invention will now be described hereinafter with reference to the accompanying drawing. An image processing apparatus according to an embodiment of the present invention can be used in an image forming apparatus such as a laser printer or a digital copying machine. The laser printer receives an image in which binarized characters and pictures both exist and outputs it onto paper by using an image output portion using, e.g., electrophotography. The digital copying machine reads an image on a document by using an image input portion such as a scanner, applies image quality adjustment, editing processing or predetermined image processing, such as compression/expansion to the inputted image, and thereafter binarizes it. Then, it outputs that image onto paper by using an image output portion using, e.g., electrophotography.

FIRST EMBODIMENT

Figure 1:
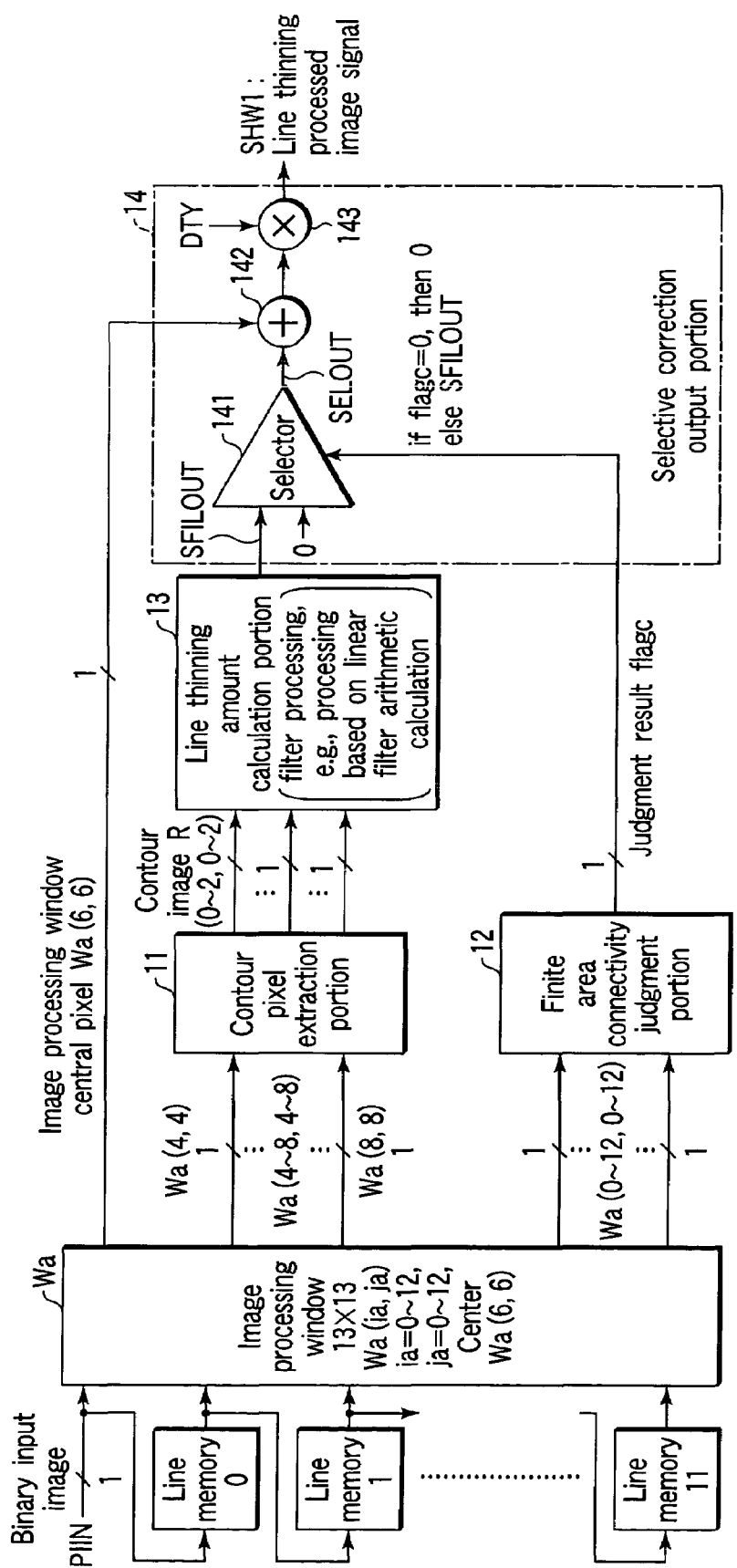
FIG. 1 is a schematic block diagram showing an image processing apparatus according to a first embodiment of the present invention.

As shown in FIG. 1, a schematic structure of the image processing apparatus is constituted by an image processing window Wa, a contour image extraction portion 11, a finite area connectivity judgment portion 12, a line thinning amount calculation portion 13, and a selective correction output portion 14. A signal outputted from the image processing window Wa is outputted to the contour pixel extraction portion 11 and the finite area connectivity judgment portion 12. A signal of a pixel at the center of the image processing window Wa is outputted to the selective connection output portion 14. A signal outputted from the contour pixel extraction portion 11 is outputted to the line thinning amount calculation portion 13. Signals outputted from the finite area connectivity judgment portion 12 and the line thinning amount calculation portion 13 are respectively outputted to the selective connection output portion 14.

The image processing window Wa will be described first. Usually, a two-dimensional image signal is inputted to the image processing window Wa from the outside. However, when the signal is inputted as a one-dimensional signal obtained by scanning the two-dimensional signal, the one-dimensional signal is latched by a plurality of line memories each having a length equal to or above a main scanning width of an image, and this signal is referred as a two-dimensional image signal including a target pixel. That is, the image processing window Wa is an area where the two-dimensional image signal including the target pixel is referred.

In the embodiment, it is determined that the image processing window Wa is formed by the line memories in case of the one-dimensional signal and an input image in the image processing window Wa can be referred irrespective of a format of a binary input image signal. Further, "1" is a signal level expressing a black image of the binary input image signal, and "0" is a signal level expressing a white image of the same.

Figure 2:
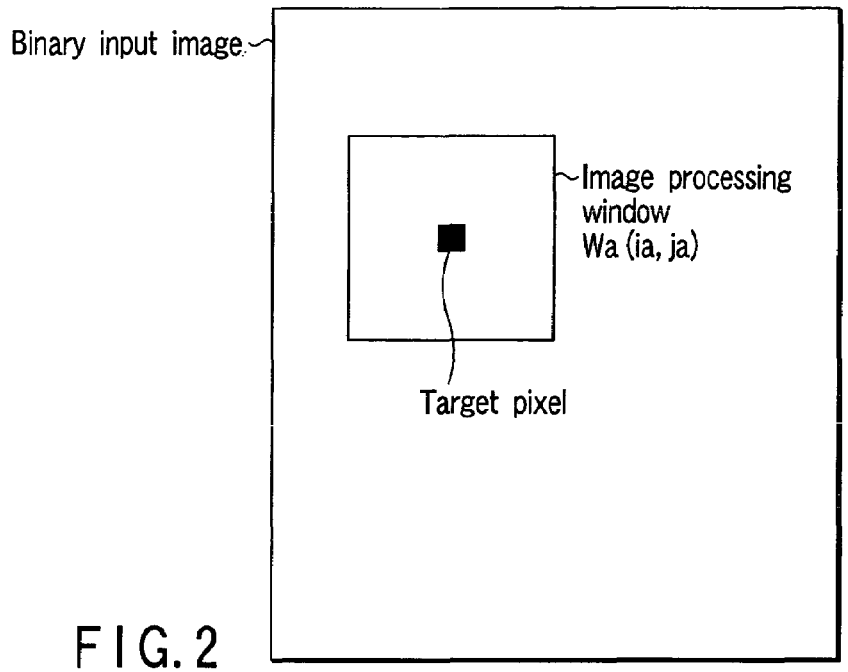
FIG. 2 is a view showing a binary input image and an image processing window.
Figure 3:
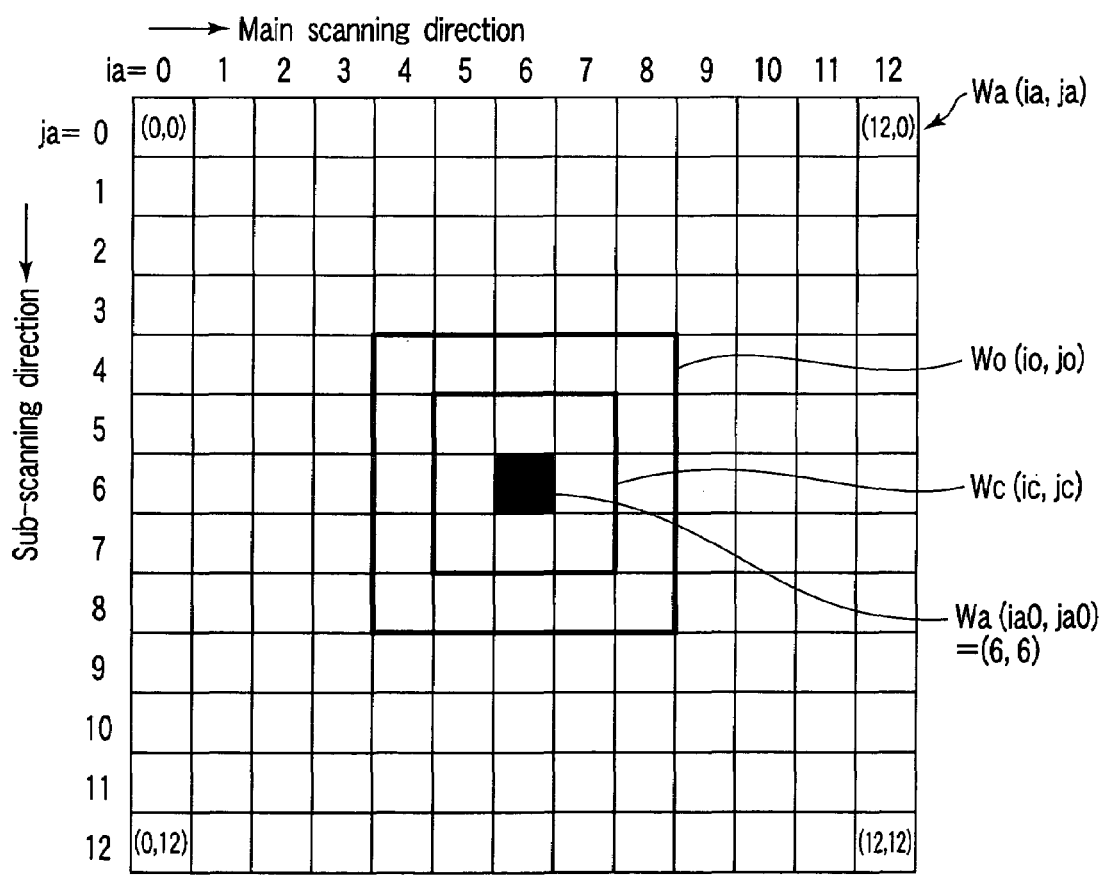
FIG. 3 is a view showing the image processing window.

FIG. 2 is a conceptual view showing an image processing window Wa (ia, ja). In this image processing window Wa (ia, ja), an input image signal corresponding to an output image signal is referred to as an image processing window central pixel Wa (ia0, ja0). As to the image processing window Wa or the image processing window central pixel, as shown in FIG. 3, it is determined that the image processing window Wa (ia, ja) consists of 13×13 pixels and coordinate expression is ia=0 to 12 (main scanning direction), ja=0 to 12 (sub-scanning direction), and the image processing window central pixel Wa (ia0, ja0) is set as Wa (ia0, ja0)=(6, 6), for example.

The contour pixel extraction portion 11 will now be described. The contour pixel extraction portion 11 executes processing to judge whether the image processing window central pixel Wa (ia0, ja0) is a contour pixel and extracts it. As shown in FIG. 4, this contour pixtel extraction portion 11 is constituted by a new processing window Wo (io, jo) used to judge the contour pixel and a plurality of contour point judgment portions.

Figure 5A:
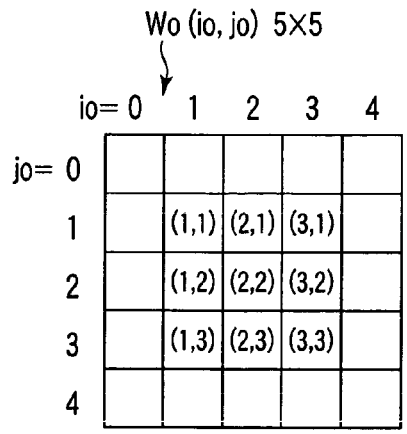
FIG. 5A is a view showing a new processing window of the contour pixel extraction portion.
Figure 5B:
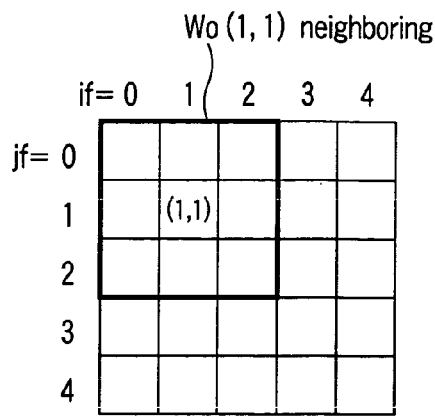
FIG. 5B is a view showing a judgment area of a contour point judgment portion.
Figure 5C:
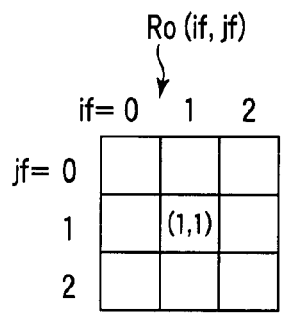
FIG. 5C is a view conceptually showing a judgment result of the contour pixel extraction portion.
Figure 5D:
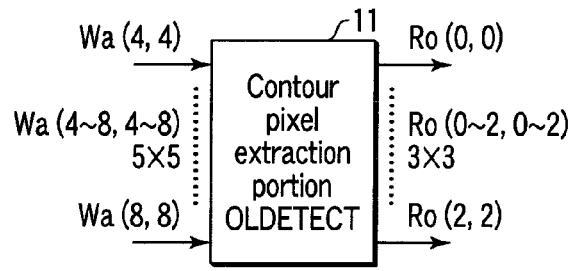
FIG. 5D is a view schematically showing a signal transmitted through the contour pixel extraction portion.

Here, description will be given as to a case that a judgment is made upon whether eight neighboring pixels plus the image processing window central pixel Wa (6,6), i.e., the image processing window Wa (5 to 7, 5 to 7) corresponds to contour pixels. Therefore, the image processing window Wa (io, jo) set as described above and the new processing window Wo (ia, ja) have the correspondence relationship of the following expressions (1) and (2) as shown in FIGS. 3 and 5A.

$$io=0 \text{ to } 4, jo=0 \text{ to } 4 \quad Wa(io, jo)=Wo(io+4, jo+4) \quad (1)$$

$$io=4 \text{ to } 8, jo=4 \text{ to } 8 \quad Wa(ia, ja)=Wo(ia-4, ja-4) \quad (2)$$

The number of a plurality of the contour point judgment portions is nine units, which are a contour point judgment portion Wo (1, 1) 111 to a contour point judgment portion Wo (3, 3) 119 used to judge whether nine pixels of the new processing window Wo (1 to 3, 1 to 3) are contour pixels. Each of the contour point judgment portion Wo (1, 1) 111 to the contour point judgment portion Wo (3, 3) 119 executes contour judgment. Each of these portions outputs, as a judgment result Ro (if, jf) if=0 to 2, jf=0 to 2, "1" when the pixel is a contour point or "0" when it is not a contour point. Therefore, the new processing window Wo (io, jo) and the judgment result Ro (if, jf) have the correspondence relationship which can be represented by the following expression (3).

$$(if, jf)=(io-1, jo-1) \quad (3)$$

For example, as shown in FIG. 4, the contour point judgment portion Wo (1, 1) 111 outputs a judgment result Ro (0, 0), and the contour point judgment portion Wo (3, 3) 119 outputs a judgment result Ro (2, 2). That is, as shown in FIGS. 5A to 5D, the contour pixel extraction portion 11 receives one-bit 5×5 pixels at the new processing windows Wo (io, jo) io=0 to 4, jo=0 to 4, and outputs one-bit 3×3 pixels of Ro (if, jf) if=1 to 3, jf=1 to 3.

Figure 6:
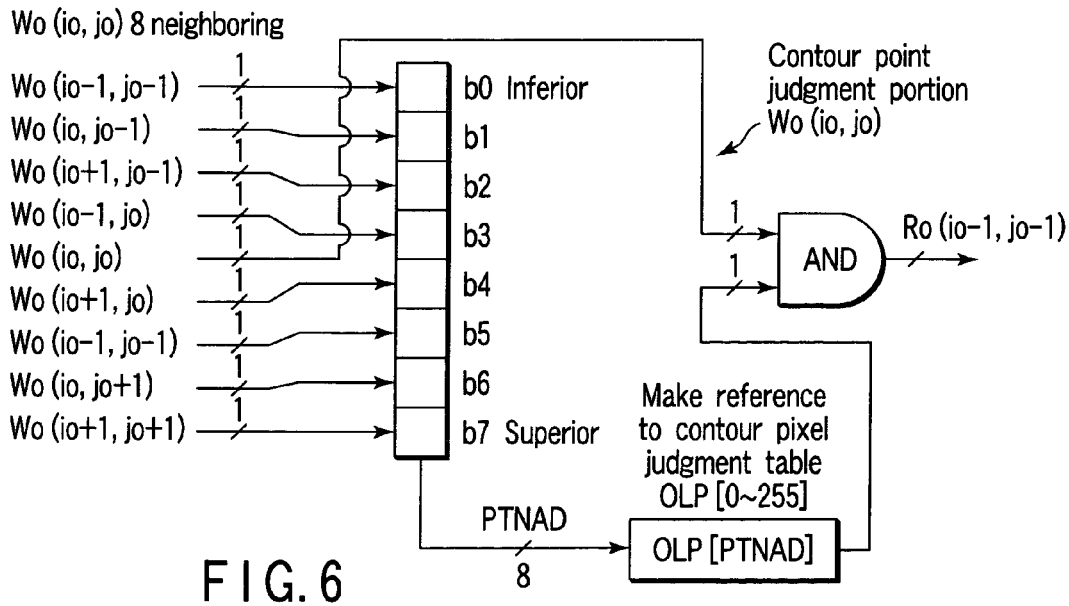
FIG. 6 is a view showing a schematic structure of the contour point judgment portion.

FIG. 6 is a view showing a schematic structure of the contour point judgment portion Wo (ia, ja). The contour point judgment portion (io, jo) (io=1 to 3, jo=1 to 3) receives a target pixel to be judged and its eight neighboring pixels. The inputted eight-neighboring pixel value is converted into an eight-bit address PTNAD of b7 (superior) to b0 (inferior). The converted value is determined as an index and a reference is made to a generated contour pixel judgment table OLP [0 to 255]. Then, a judgment result Ro (io−1, jo−1) of the contour point is obtained by acquiring a logical product with the target pixel to be judged, i.e., based on the following expressions (4).

$$Ro(io-1, jo-1)=Wo(io, jo) \text{ AND OLP [PTNAD]} \quad (4)$$

As shown in FIG. 7A, data corresponding to the contour pixels stored in the contour pixel judgment table OLP is data of a total of nine pixels which are the target pixel and the eight pixels arranged around the target pixel. These pixels are arranged in such a manner that the upper left of the target pixel is associated with b0 of the address PTNAD and the remaining pixels around the target pixel are associated with b1 to b7 of the address PTNAD in the clockwise direction. As shown in FIG. 7B, each piece of data is formed so as to be expressed by black when a judgment result is 1 or expressed by white when a judgment result is 0. As shown in FIG. 7C, in regard to the data corresponding to the contour pixels, i.e., the contour pattern, the contour pattern shown in, e.g., FIG. 7C is associated with a predetermined number and stored.

For example, in the case of an address PTNAD=1101 0110b=D6H=214, since this corresponds to the contour pattern of the number 5 in FIG. 7C, the contour pixel judgment table OLP is OLP [214]=1. As to an address PTNAD=0000 0000b=00H=0 such as a white background which does not correspond to the contour, since there is no corresponding contour pattern, OLP [0]=0 is obtained.

With the above-described operation, the contour pixel extraction portion 11 outputs to the line thinning amount calculation portion 13 Ro (if, jf) if=0 to 2, if=0 to 2 which indicates whether the image processing window central pixel Wa (ia0, ja0) and its eight neighboring pixels are the contour pixels.

The finite area connectivity judgment portion 12 will now be described. The finite area connectivity judgment portion 12 judges whether the image processing window central pixel Wa (ia0, ja0) is connected to the surrounding pixels. The finite area connectivity judgment portion 12 outputs a judgment result flagc=1 when the central pixel is determined as being connected, and a judgment result flagc=0 when the central pixel is determined as not being connected. It is to be noted that there are various definitions as definitions of the connectivity but a state which is judged as "true" based on an algorithm shown in a flowchart of FIG. 8 is determined as the connectivity.

Figure 8:
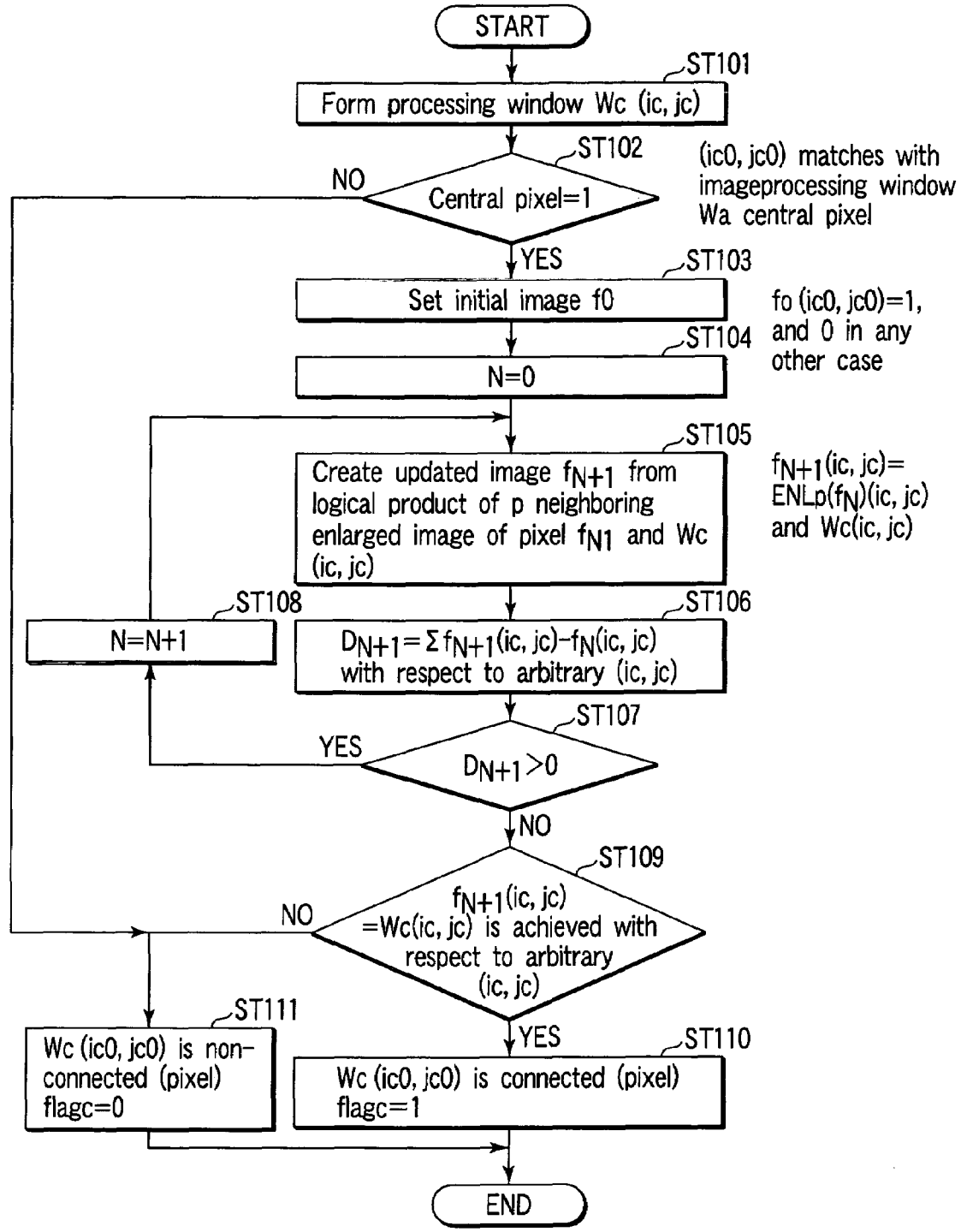
FIG. 8 is a flowchart showing processing of a finite area connectivity judgment portion.

Before explaining the flowchart of FIG. 8, p-neighboring enlargement processing will be first defined. The p-neighboring enlargement processing is processing to change neighboring pixels of a black pixel into black pixels if there is a black pixel in an image. For example, as shown in FIG. 9A, it is assumed that a coordinate (i, j) is a black pixel. In this case, in the eight-neighboring enlargment processing, the eight pixels surrounding the black pixel are changed into black pixels, as shown in FIG. 9B. Further, in four-neighboring enlargement processing, four pixels provided on the upper, lower, right and left sides of the black pixel are changed into black pixels, as shown in FIG. 9C. This p-neighboring enlargement processing is represented as ENLp (g). That is, an image obtained by subjecting an image g to the eight-neighboring enlargement processing is expressed as ENL8 (g), and a (i, j) coordinate pixel value of the image obtained after the eight-neighboring enlargement processing is represented as ENL (g) (i, j).

The operation of the finite area connectivity judgment portion 12 will now be described with reference to the flowchart of FIG. 8.

At a step ST101, the judgment portion 12 cuts out a part of an image signal in the image processing window Wa (ia, ja) as a processing window Wc (ic, jc). An area from which the processing window Wc (ic, jc) is cut out does not have to be rectangular, and it may be an area having a substantially rhombus shape, as shown in FIG. 10 or it may be an area having an arbitrary shape. In brief, it is good enough that the processing window Wc (ic, jc) as a cutout area is a finite area. However, the processing window Wc (ic, jc) must have a center (ic0, jc0) and this center (ic0, jc0) must be matched with a central coordinate (ia0, ja0) of the image processing window Wa (ia, ja). For example, in FIG. 10, it is determined that Wc (ic0, jc0)=Wc (4, 4)=Wa (ia0, ja0) =Wa (6, 6).

Subsequently, at a step ST 102, the judgment portion 12 judges whether the central pixel (ic0, jc0) of the processing window Wc (ic, jc) is 1, i.e., a black pixel. If a result is true, i.e., a black pixel, the processing advances to a next step. If a result is not true, i.e., a white pixel, the central pixel is obviously different from an area where black pixels are connected, and hence the non-connectivity is determined at this moment.

Upon determining that the central pixel is a black pixel, the judgment portion 12 sets an initial image $f_0$ of an area having the same dimension as the processing window Wc (ic, jc) at a step ST 103. This initial image $f_0$ is determined as $f_0$ (ic0, jc0)=1, and any other area is determined as an image being 0.

At a step ST 104, the judgment portion 12 initializes a repeat loop counter N used to repeat processing for a predetermined number of times into 0.

At a step ST 105, the judgment portion 12 creates an updated image $f_{N+1}$ based on a logical product of the p-neighboring enlargement image of the image $f_N$ and the processing window Wc (ic, jc) by using the following expression (5).

$$f_{N+1}=(ic, jc)=ENLp(f_N)\ (ic, jc)\ \text{AND}\ Wc(ic, jc) \quad (5)$$

At a step ST106, the judgment portion 12 calculates an image differential sum $D_{N+1}$ of $f_{N+1}$ and $f_N$, i.e., a sum total at an arbitrary (ic, jc) in the processing window Wc (ic, jc) by using the following expression (6).

$$D_{N+1}=\Sigma\{f_{N+1}(ic, jc)-f_N(ic, jc)\} \quad (6)$$

When the judgment portion 12 determines $D_{N+1}>0$ at a step ST107, the repeat loop counter N is updated to N+1 at a step ST108, and the control returns to the processing to create the updated image $f_{N+1}$ of the step ST106. When the judgment portion 12 determines $D_{N+1}=0$, it judges whether the updated image $f_{N+1}$ matches with the processing window Wc (ic, jc) at a step ST109. Wc (ic0, jc0) has the connectivity if it is determined that they match with each other, and Wc (ic0, jc0) has the non-connectivity if they do not match each other.

The judgment portion 12 judges the connectivity of the black pixels based on this processing. If it determines the connectivity (true), it outputs the judgment result flagc=1 to the selective correction output portion 14 at a step ST110. If the judgment portion 12 determines the non-connectivity (false), it outputs the judgment result flagc=0 to the selective correction output portion 14 at a step ST111.

It is to be noted that loop processing to create the image $f_N$ in the flowchart of FIG. 8 does not diverge since it does not exceed the number of black pixels in the processing window Wc (ic, jc) area.

FIGS. 11A and 11B show examples of the processing window Wc (ic, jc) whose size is determined as 7×7 (pixels) and which is cut out with the center (ic0, jc0)=(3, 3). FIG. 11A shows a part of a dot image, and FIG. 11B shows a part of a character image. Judging based on the flowchart shown in FIG. 8, a part of the dot image is determined as not being connected, and a part of the character image is determined as being connected. In order to determine that the dot image has the non-connectivity, the vertical and horizontal sizes of the processing window Wc (ic, jc) must be larger than a cycle S1 of dots (distance between the centers of dots and dots) shown in FIG. 11A. Moreover, in order to judge that the character image has the connectivity, the vertical and horizontal sizes of the processing window Wc (ic, jc) must be not more than a line width L1 (four pixels in a j direction) shown in FIG. 11B.

The line thinning amount calculation portion 13 will now be described. The line thinning amount calculation portion 13 determines a line thinning amount every time filter processing is carried out to the judgment result Ro (if, jf) if=0 to 2, jf=0 to 2 of the contour pixels neighboring the image processing window central pixel Wa (ia0, ja0) outputted from the contour pixel extraction portion 11.

For example, assuming that fc (if, jf) is a filter coefficient which is a parameter when executing a linear filter arithmetic operation, a line thinning amount SFILOUT which is a sum total at an arbitrary (if, jf) is determined based on the following expression (7).

$$SFILOUT = \Sigma fc(if, jf) * Ro(if, jf) \quad (7)$$

The coefficient fc is represented by, e.g., the following expressions (8), (9) and (10).

$$fc = \begin{pmatrix} fc(0,0) & fc(0,1) & fc(0,2) \\ fc(1,0) & fc(1,1) & fc(1,2) \\ fc(2,0) & fc(2,1) & fc(2,2) \end{pmatrix} = \begin{pmatrix} 0 & 0 & 0 \\ 0 & -1.0 & 0 \\ 0 & 0 & 0 \end{pmatrix} \quad (8)$$

$$fc = \begin{pmatrix} fc(0,0) & fc(0,1) & fc(0,2) \\ fc(1,0) & fc(1,1) & fc(1,2) \\ fc(2,0) & fc(2,1) & fc(2,2) \end{pmatrix} = \begin{pmatrix} 0 & -0.25 & 0 \\ -025 & -0.25 & -0.25 \\ 0 & -0.25 & 0 \end{pmatrix} \quad (9)$$

$$fc = \begin{pmatrix} fc(0,0) & fc(0,1) & fc(0,2) \\ fc(1,0) & fc(1,1) & fc(1,2) \\ fc(2,0) & fc(2,1) & fc(2,2) \end{pmatrix} = \begin{pmatrix} -0.11 & -0.11 & -0.11 \\ -0.11 & -0.12 & -0.11 \\ -0.11 & -0.11 & -0.11 \end{pmatrix} \quad (10)$$

Further, a minimum value filter (MIN), a maximum value filter (MAX), a medium value filter (MED) may be used in some cases. In this case, as to the line thinning amount SFILOUT, a minimum value relative to an arbitrary Ro (if, jf) can be obtained based on the expression (11), i.e., SFILOUT=-MIN (Ro (if, jf)) (11), a maximum value relative to an arbitrary Ro (if, jf) can be obtained based on the expression (12), i.e., SFILOUT=-MAX (Ro (if, jf)) . . . (12), and a medium value relative to an arbitrary Ro (if, jf) can be obtained from the expression (13), i.e., SFILOUT=-MED (Ro (if, jf)) . . . (13), respectively.

By using the linear filter arithmetic operation processing relative to the contour pixels in the calculation of a line thinning amount in this manner, it is possible to realize multiple values of the binary image input signal, which is simpler than the complicated conventional technique such as spline interpolation.

The selective correction output portion 14 will now be described. The selective correction output portion 14 is, as shown in FIG. 1, constituted by a selector 141, an addition portion 142, and a multiplier 143 which is a standardization portion for an output signal range.

In the selective correction output portion 14, the selector 141 is switched in accordance with the judgment result flagc outputted from the finite area connectivity judgment portion 12. By changeover of the selector 141, any one of the line thinning amount SFILOUT outputted from the line thinning amount calculation portion 13 and "0" is outputted to the addition portion 142. That is, if black pixel areas are not connected in the judged area (flagc=0), since the possibility of a dot image is high, the final line thinning amount is determined as SELOUT=0. If black pixel areas are connected (flagc=1), since the possibility of a non-dot image is high, the final line thinning amount is determined as SELOUT=SFILOUT.

Then, when the addition portion 142 adds the obtained final line thinning amount SELOUT to a value of the image processing window central pixel Wa (6, 6) which is a target pixel, the image processing apparatus can execute line thinning except for the case that the binary input image is a dot image. Subsequently, the multiplier 143 multiplies the addition result by DTY (multiplier factor used to execute standardization) in order to standardize the addition result to an output signal range, and outputs an obtained result as a line thinning processed image signal SHW1. That is, SHW1 is obtained based on the following expression (14).

$$SHW1 = (SELOUT + Wa(ia0, ja0)) * DTY \quad (14)$$

For example, if the output signal range is an integer value from 0 to 255, the calculation can be obtained from the following expression (15), and fractions after decimal point of a multiplication result is rounded off.

$$SHW1 = (SELOUT + Wa(ia0, ja0)) * 255 \quad (15)$$

As described above, when judging whether the including a target pixel, the size of the processing in-area black pixels are connected in a finite area window Wc (ic, jc) of the finite area connectivity judgment portion 12 is appropriately determined taking a size or a line width of dots into consideration. If the judgment portion 12 determines that the connectivity in the processing window Wc (ic, jc) is true, it can be considered that the target pixel is not a part of the dots. Based on this, the selector 141 is switched in the adaptive manner in accordance with a judgment result of the connectivity in the judgment portion 12. That is, if the judgment portion 12 determines that the connectivity is true, the selector 141 is switched, the line thinning amount SFILOUT is outputted as SELOUT, and the line thinning amount is added to the target pixel value in the addition portion 142. If the judgment portion 12 determines that the connectivity is not true, the selector 141 is switched, "0" is outputted as SELOUT, and "0" is added to the target pixel value. As a result, the image processing apparatus can execute the line thinning processing of the image in the adaptive manner without degrading the gray scale reproduction.

In addition, the image forming apparatus using such an image processing apparatus can adaptively reduce a consumption of the toner consumed during printing, without deteriorating the gray scale reproduction.

SECOND EMBODIMENT

A second embodiment will now be described. It is to be noted that like reference numerals denote parts equal to those in the foregoing embodiment, thereby omitting a detailed explanation.

Figure 12:
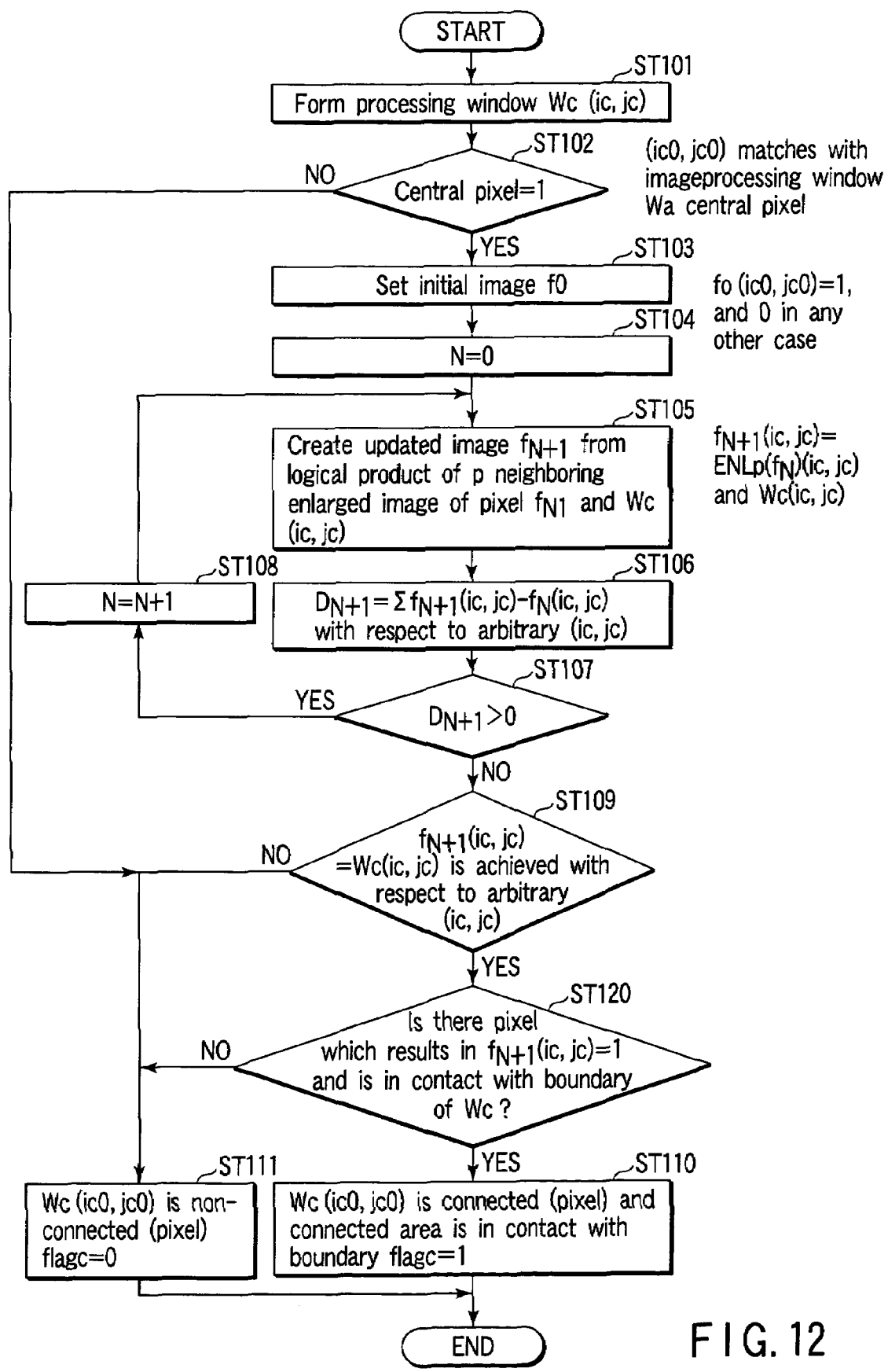
FIG. 12 is a flow chart showing processing of a finite area connectivity judgment portion according to a second embodiment.

A difference from the first embodiment is that the processing executed by the finite area connectivity judgment portion 12 is processing shown in a flowchart of FIG. 12 in place of the processing depicted in the flowchart of FIG. 8. In the processing of the second embodiment, after determining that the black pixel areas are connected (YES at a step ST109), there is provided processing to judge whether the black pixel of the updated image $f_{N+1}$ is in contact with the boundary of the processing window Wc (ic, jc) as a step ST120.

That is, upon determining that the black pixel areas are connected (YES at the step ST109), the finite area connectivity judgment portion 12 judges whether the black pixel areas are in contact with the boundary of the processing window Wc (ic, jc) (step ST120). If YES is obtained in this judgment, the processing advances to a step ST110, and a judgment result flagc=1 is outputted to the selector 141. If NO is obtained, the processing advances to a step ST111, and a judgment result flagc=1 is outputted to the selector 141.

If it is determined that the black pixel areas in the processing window Wc (ic, jc) are connected at the step ST109 and the connected areas are in contact with the boundary of the processing window Wc (ic, jc) at the step ST120, the connected black pixel areas may possibly be extended to the outside of the processing window Wc (ic, jc). This roughly shows the lower bound of the size of the processing window Wc (ic, jc). That is, by determining that the connected areas are in contact with the boundary of the processing window Wc (ic, jc), these areas can be separated into a black pixel area, which is a small isolated point such as shown in FIG. 13, and an element of the black pixel area including a large solid. Additionally, if the black pixel area is not in contact with the boundary of the processing window Wc (ic, jc), the selective correction output portion 14 switches the selector 141, and outputs "0" as SELOUT. In this case, since the target pixel value is not subjected to line thinning processing in the addition portion 142, it is possible to suppress blurring or loss of a part of a character due to line thinning of the small isolated point.

THIRD EMBODIMENT

A third embodiment will now be described. It is to be noted that like reference numerals denote parts equal to those in the first embodiment, thereby omitting the detailed explanation.

A different form of the first embodiment is that a rectangular area connectivity judgment portion 15 is provided in place of the finite area connectivity judgment portion 12 as shown in FIG. 14. The rectangular area connectivity judgment portion 15 executes the judgment of the connectivity with respect to the upper side, the left side, the lower side and the right side of the processing window Wc (ic, jc) cut out from a rectangular shape.

Figure 15:
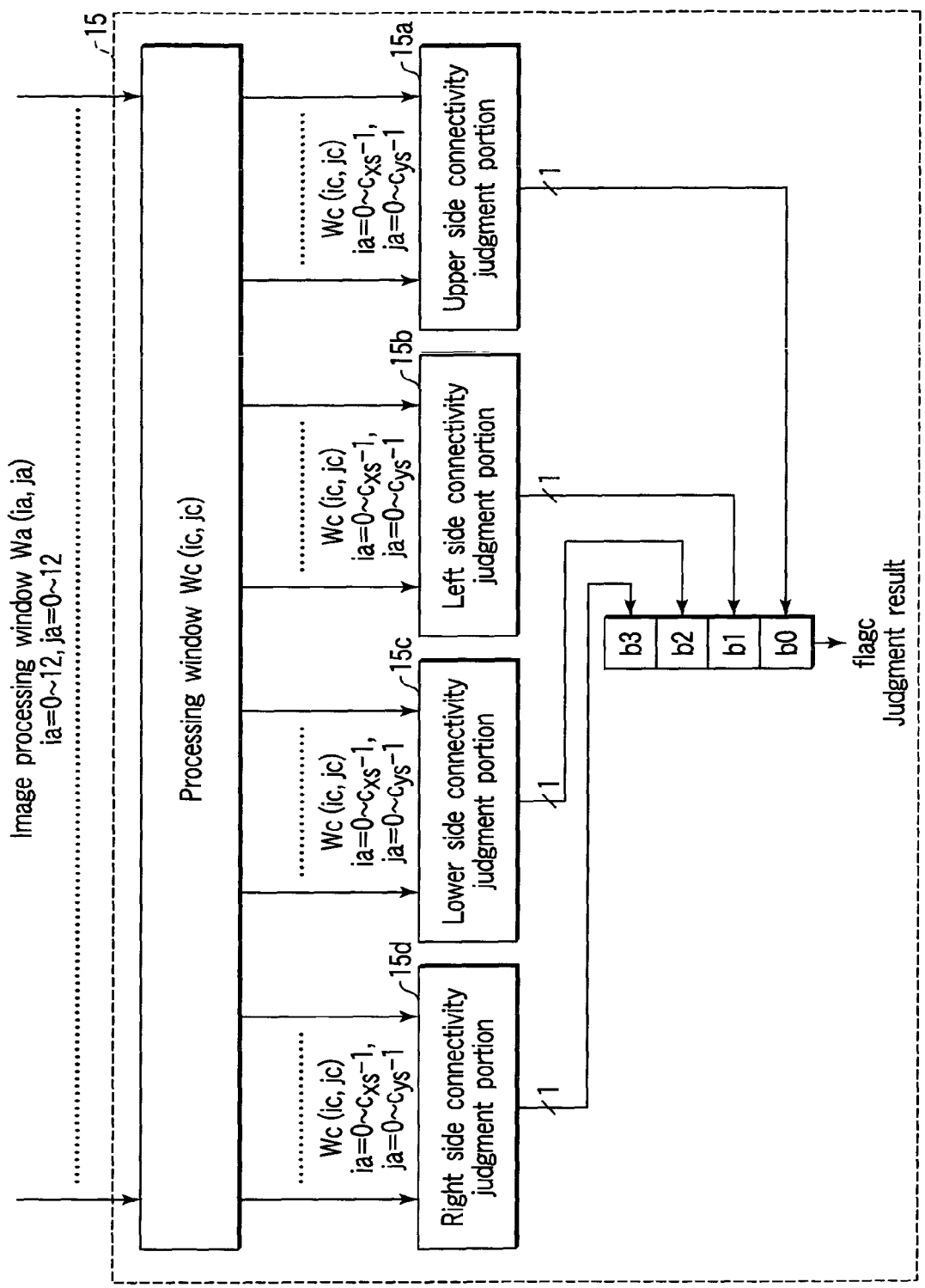
FIG. 15 is a view showing a schematic structure of a rectangular area connectivity judgment portion.

The rectangular area connectivity judgment portion 15 is, as shown in FIG. 15, schematically constituted by a processing window Wc (ic, jc), an upper side connectivity judgment portion 15a, a left side connectivity judgment portion 15b, a lower side connectivity judgment portion 15c and a right side connectivity judgment portion 15d.

Figure 16:
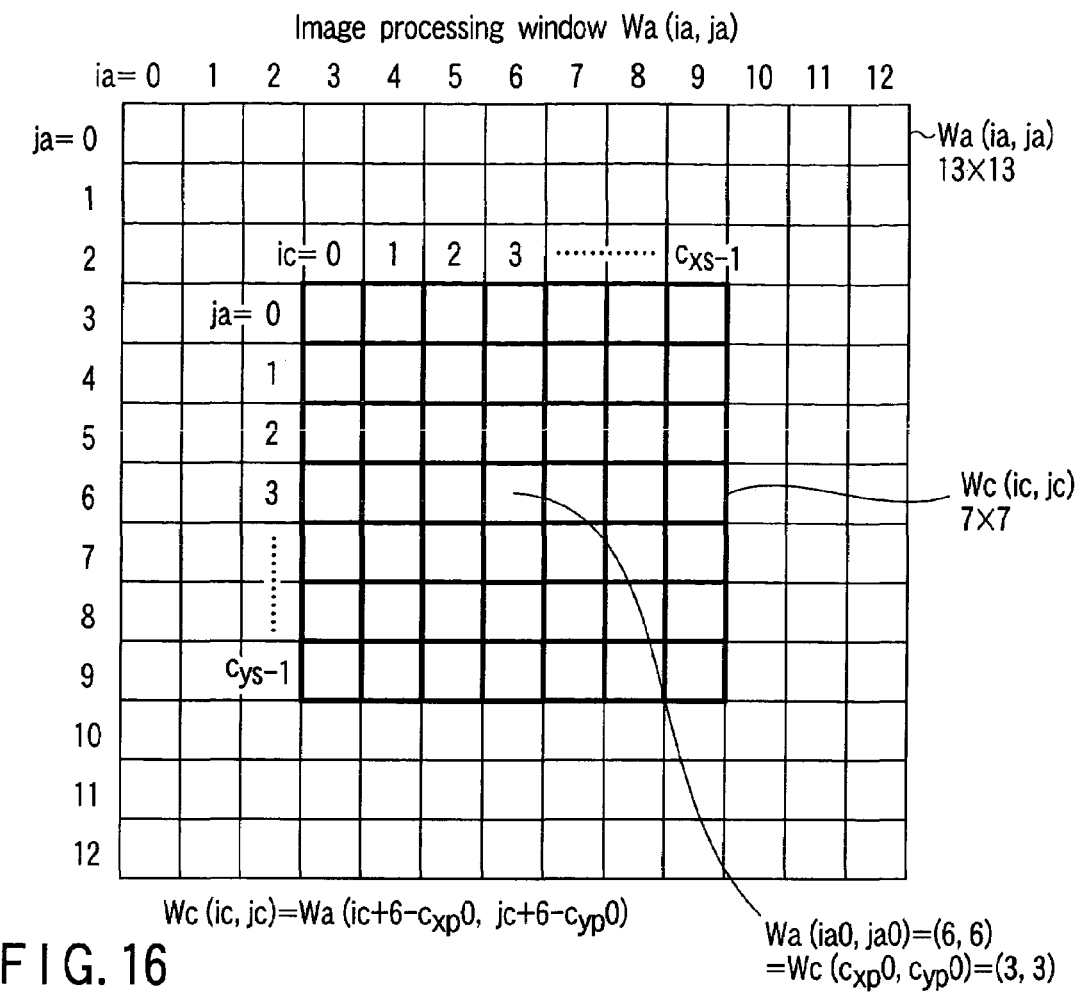
FIG. 16 is a view showing a rectangular processing window.

In this embodiment, the processing window Wc (ic, jc) is determined as a rectangular window obtained by cutting out a part of the image processing window Wa (ia, ja), and has $c_{xs}$ pixels in the horizontal direction and $c_{ys}$ pixels in the vertical direction as its size. Further, a central coordinate of the processing window Wc (ic, jc) is determined as ($c_{xp0}$, $c_{yp0}$), and the processing window is cut out in such a manner that this coordinate matches with the image processing window central pixel Wa (ia0, ja0). That is, the processing window has the relationship of the processing window Wc (ic, jc)=image processing window Wa (ic+ia0-$c_{xp}$, jc+ja0-$c_{y0}$) ic=0 to $c_{xs-1}$, jc=0 to $c_{ys-1}$. FIG. 16 is a conceptual view showing the association when the image processing window Wa (ia, ja) has the pixel size of 13×13 and its center (ia0, ja0)=(6, 6) and the processing window Wc (ic, jc) has the pixel size of 7×7 and its center ($c_{xp0}$, $c_{yp0}$)=(3, 3).

The upper side connectivity judgment portion 15a presumes that the black pixel area expands to the outside of the upper side of the processing window Wc (ic, jc) (which is referred to as a virtual black pixel area and its area is indicated by slanting lines in the drawing), and judges whether all the black pixel areas in the processing window Wc (ic, jc) include the center ($c_{xp0}$, $x_{yp0}$) and are connected with a virtual black pixel area provided outside the upper side in the vertical direction.

Figure 17A:
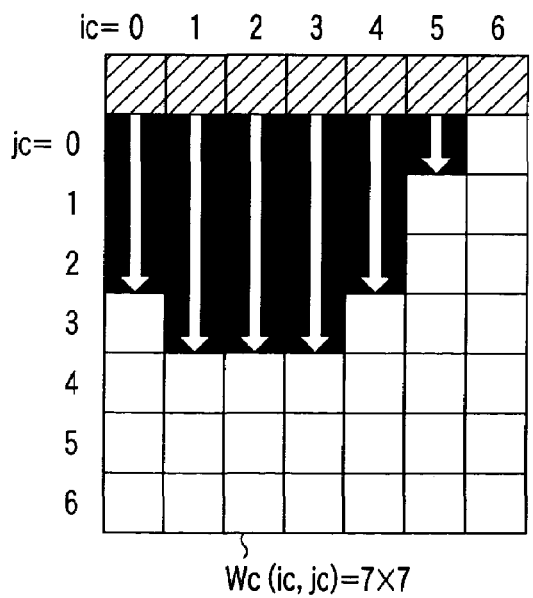
FIG. 17A is a view showing an example of the upper side connectivity of black pixel areas.
Figure 17B:
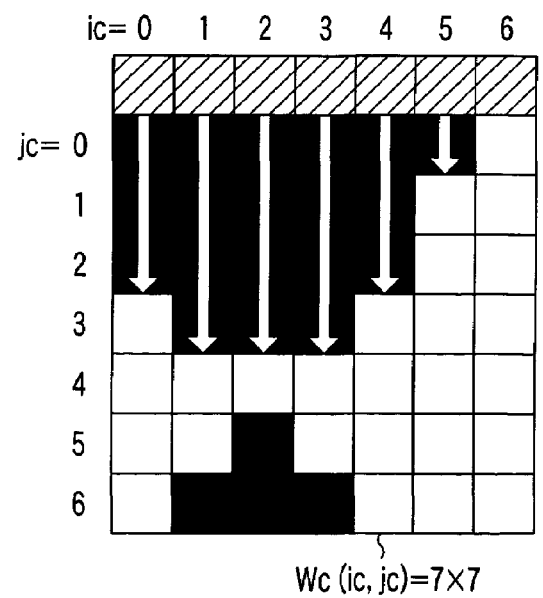
FIG. 17B is a view showing an example of the upper side non-connectivity of black pixel areas.

FIG. 17 show concrete examples that the processing window Wc (ic, jc) has the pixel size of 7×7 and the black pixels are connected and not connected to the upper side. When the black pixels in the processing window Wc (ic, jc) have a distribution shown in FIG. 17A, all the black pixels in the processing window Wc (ic, jc) are connected with the virtual black pixel area provided outside the upper side in the vertical direction, as indicated by arrows in the drawing. Therefore, the upper side connectivity judgment portion 15a determines the connectivity of the upper side. On the other hand, when the black pixels in the processing window Wc (ic, jc) have a distribution shown in FIG. 17B, the black pixels provided near the upper side of the processing window Wc (ic, jc) are connected as indicated by arrows in the drawing, but the black pixels provided near the lower side are not connected to the upper side in the vertical direction. Therefore, the upper side connectivity judgment portion 15a determines the non-connectivity of the upper side.

Figure 18:
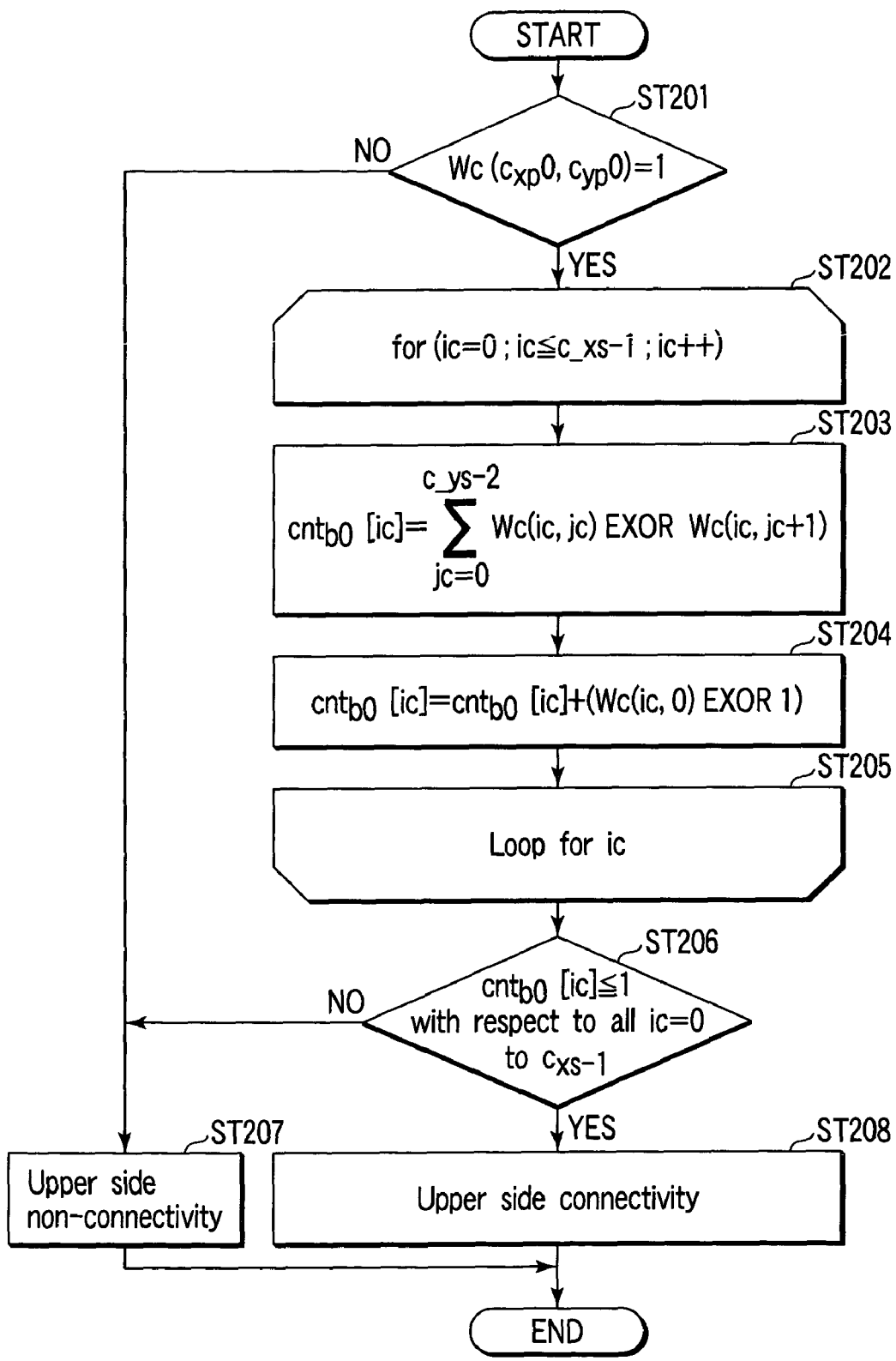
FIG. 18 is a flowchart showing processing of an upper edge connectivity judgment portion.

FIG. 18 is a flowchart showing an example of concrete processing to judge the connectivity of the black pixel areas in the upper side connectivity judgment portion 15a using $c_{xs}$ counters and a logic OR arithmetic operation.

First, at a step ST201, the upper side connectivity judgment portion 15a judges whether the center ($c_{xp0}$, $c_{yp0}$) of the processing window Wc (ic, jc) is "1". If it is determined that the center is not "1", i.e., "0 (white image)", since it is an element which does not have to be taken into consideration with respect to the line thinning processing, the judgment portion 151 immediately determines the non-connectivity of the upper side and terminates the processing.

Figure 19A:
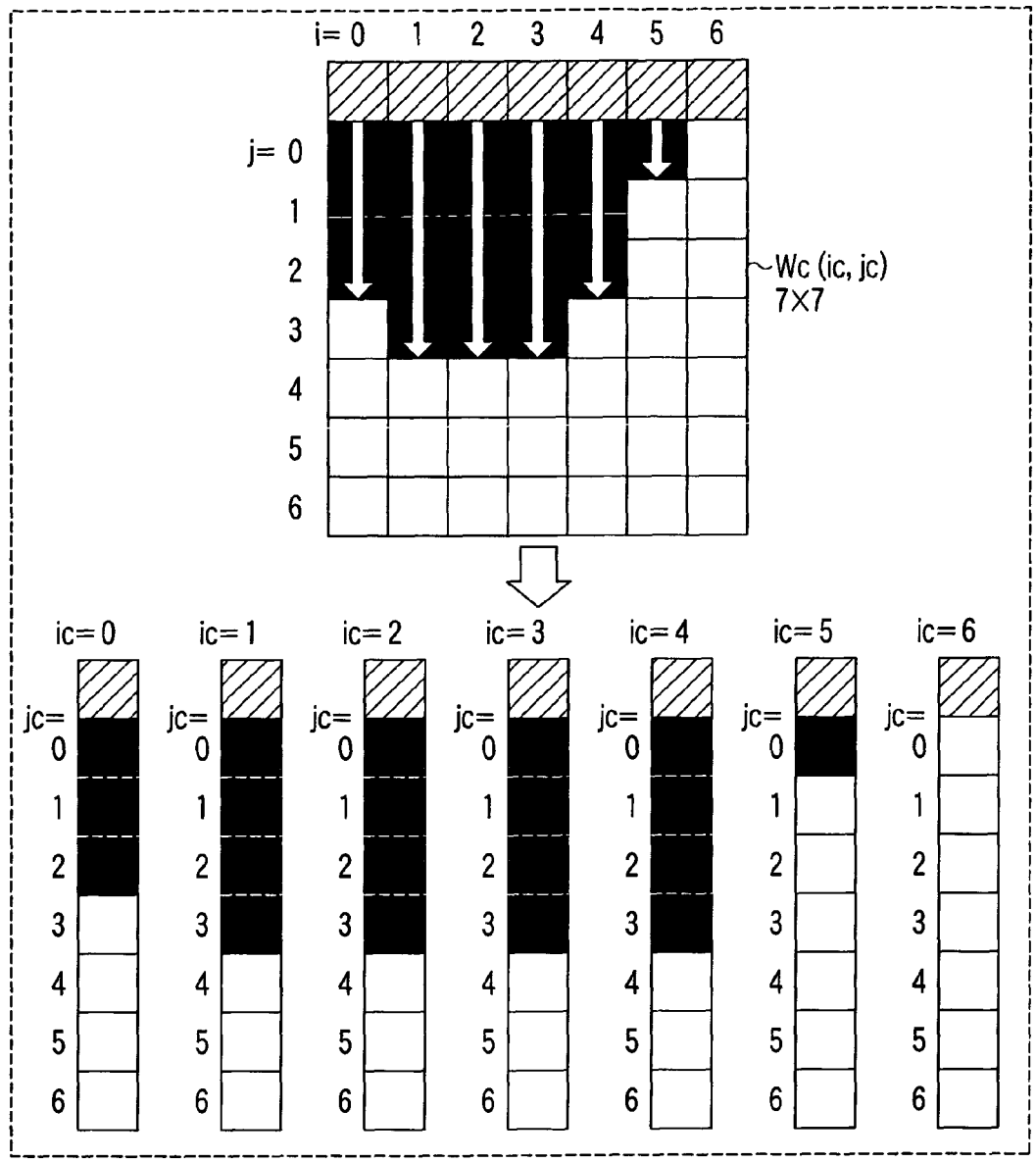
FIG. 19A is a view conceptually showing association between each row of the processing window and a counter.
Figure 19B:
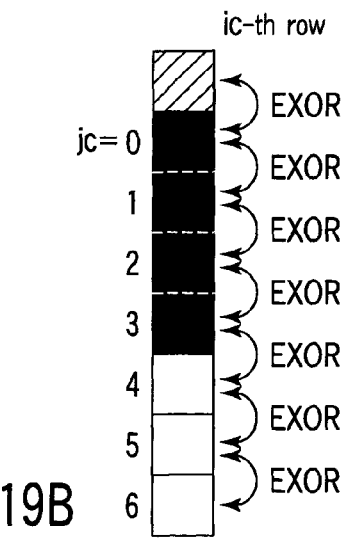
FIG. 19B is a view showing calculation of an exclusive OR of two pixels adjacent to each other in each row.

Subsequently, at steps ST202 to ST205, the judgment portion 15a executes loop processing concerning a counter $cnt_{b0}$[ic] corresponding to each row (ic). The counter $cnt_{b0}$[ic] corresponds to each strip fragmented in accordance with each row shown in a type drawing of FIG. 19A. As shown in FIG. 19B, the judgment portion 15a obtains an exclusive OR (EXOR) of two pixels adjacent to each other including a virtual black pixel, and counts up the counter $cnt_{b0}$[ic] with this result. That is, it counts up with "1" the counter $cnt_{b0}$[ic] corresponding to a case that one of the two adjacent pixels in each row is "1" and the other pixel is "0".

At a step ST206, the judgment portion 15a judges whether the upper side of the processing window Wc (ic, jc) is connected or not connected. Since the number of times that the exclusive OR becomes 1 in each row is not more than one in case of the connectivity of the upper side, i.e., values of all the counters $cnt_{b0}$[ic] are not more than 1, this judgment is carried out by checking this.

In this manner, the upper side connectivity judgment portion 15a executes the processing to judge whether the black pixel areas are connected or not connected with the upper side. Furthermore, the upper side connectivity judgment portion 15a outputs a judgment result of one bit "1" when the upper side connectivity is determined, and outputs a judgment result of one bit "0" when the upper side non-connectivity is determined.

Likewise, the left side connectivity judgment portion 15b assumes that the black pixels extend to the outside of the left side of the processing window Wc (ic, jc). Then, it judges whether the black pixel areas in the processing window Wc (ic, jc) include the center ($c_{xp0}$, $c_{yp0}$) and all the black pixel areas are connected with the virtual black pixel area provided outside the left side in the vertical direction. As to the concrete processing, it is determined that the processing executed in the upper side connectivity judgment portion 15a is carried out at 90 degrees in the counterclockwise direction in the drawing. Moreover, the left side connectivity judgment portion 15b outputs a judgment result of one bit "1" when the left side connectivity is determined, and outputs a judgment result of one bit "0" when the left side non-connectivity is determined.

Likewise, the lower side connectivity judgment portion 15c assumes that the black pixels extend to the outside of the lower side of the processing window Wc (ic, jc). Then, it judges whether the black pixel areas in the processing window Wc (ic, jc) include the center ($c_{xp0}$, $c_{yp0}$) and all the black pixel areas are connected with the virtual black pixel area provided outside the lower side in the vertical direction. As to the concrete processing, it is determined that the judgment portion 15a is performed in the inverted manner. In addition, the lower side connectivity judgment portion 15c outputs a judgment result of one bit "1" when the lower side connectivity is determined, and outputs a judgment result of one bit "0" when the lower side non-connectivity is determined.

Likewise, the right side connectivity judgment portion 15d assumes that the black pixels extend to the outside of the right side of the processing window (ic, jc). Then, it judges whether the black pixel areas in the processing window Wc (ic, jc) include the center ($c_{xp0}$, $c_{yp0}$) and all the black pixel areas are connected with the virtual black pixel area provided outside the right side in the vertical direction. As to the concrete processing, the processing executed in the upper side connectivity judgment portion 15a is carried out at 90 degrees in the clockwise direction in the drawing. Then, the right side connectivity judgment portion 15d outputs a judgment result of one bit "1" when the right side connectivity is determined, and outputs a judgment result of one bit "0" when the right side non-connectivity is determined.

In this manner, as shown in FIG. 15, the judgment result of each one bit from the upper side connectivity judgment portion 15a, the left side connectivity judgment portion 15b, the lower side connectivity judgment portion 15c and the right side connection judgment portion 15d corresponding to four sides of the rectangle are outputted to the selective correction output portion 14 from the rectangular area connectivity judgment portion 15 as a judgment result flagc consisting of four bits. An output from the upper side connectivity judgment portion 15a is the 0-th bit (b0) of the judgment result flagc. An output from the left side connectivity judgment portion 15b is the 2nd bit (b1) of the judgment result flagc. An output from the lower side connectivity judgment portion 15c is the 3rd bit (b2) of the judgment result flagc. An output from the right side connectivity judgment portion 15d is the 4th bit (b3) of the judgment result flagc.

If the judgment result flagc=0, the selective correction output portion 14 determines the black pixel area is an isolated point or dots since it is not connected to any side of the processing window Wc (ic, jc). As a result, the selector 141 determines an output to the addition portion 142 as the final line thinning amount SELOUT=0, and the line thinning processing of the target pixel is not carried out in the addition portion 142. Additionally, if the judgment result is not flagc=0, the selective correction output portion 14 determines the black pixel area is a solid since it is connected to any side of the processing window Wc (ic, jc). As a result the selector 141 determines an output to the addition portion 142 as the final line thinning amount SELOUT=the line thinning amount SFILOUT, and the line thinning processing to add the line thinning amount to the target pixel value is executed in the addition portion 142.

As described above, the processing window Wc (ic, jc) as a reference area is a rectangular area and the connectivity of the black pixel areas relative to each of four sides in the vertical direction is judged. As a result, the image processing apparatus can execute the fixed rate processing oriented arithmetic operation.

FOURTH EMBODIMENT

A fourth embodiment will now be described. It is to be noted that like reference numerals denote parts equal to those in the third embodiment, thereby omitting the detailed explanation.

Figure 20:
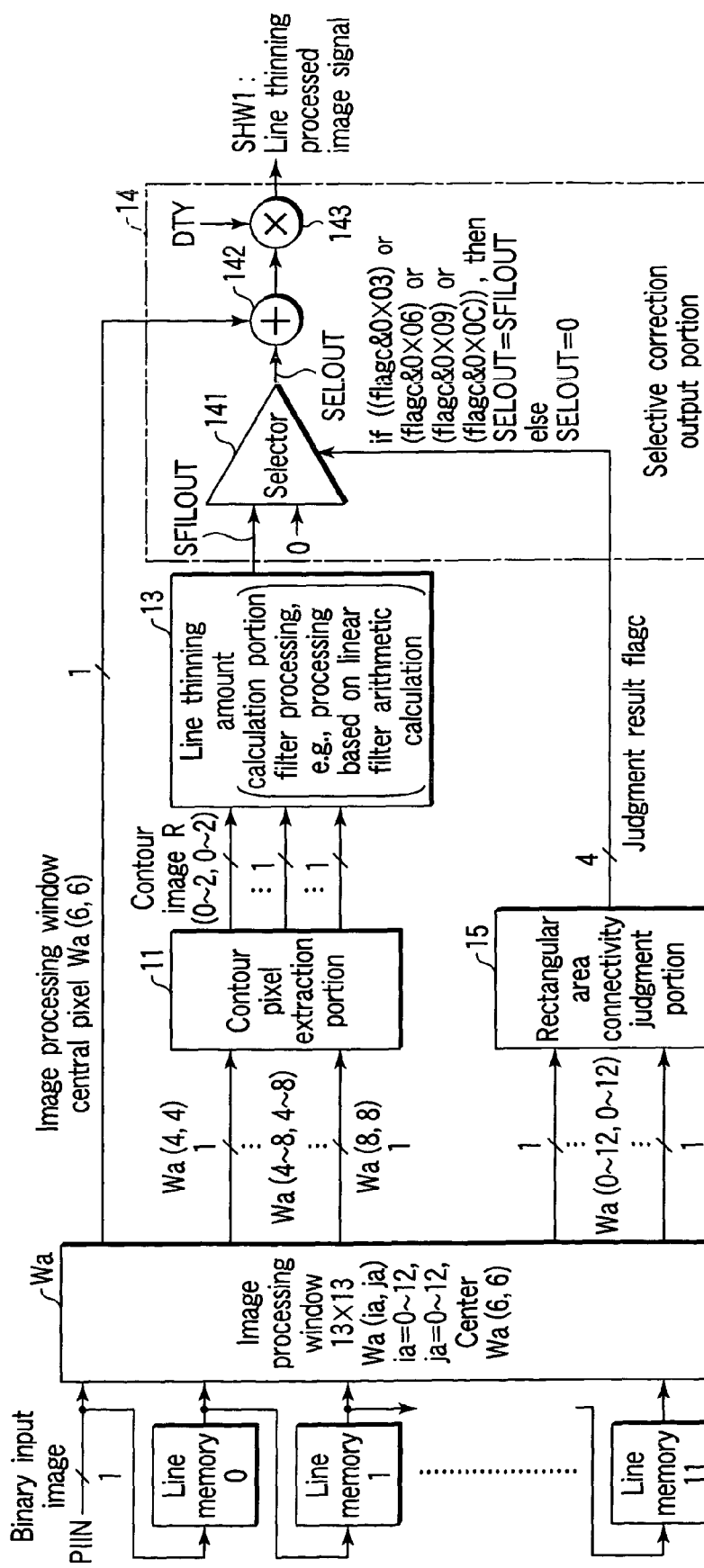
FIG. 20 is a schematic block diagram showing an image processing apparatus according to a fourth embodiment.

A difference from the third embodiment is the operation of the selector 141 in the selective correction output portion 14 as shown in FIG. 20. That is, only when the judgment result flag consisting of four bits outputted from the rectangular area connectivity judgment portion 15 is (flagc & 0x03)=0x03 or (flagc & 0x06)=0x06 or (flagc & 0x0c)=0x0c or (flagc & 0x09)=0x09, the selector 141 enables the line thinning processing as SELOUT=SFILOUT. The (flagc & 0x03)=0x03 means that a result of Bit wise AND of flagc and 0x03 becomes 0x03. That is, it corresponds to the upper side connectivity and the left side connectivity. The (flagc & 0x06)=0x06 corresponds to the left side connectivity and the lower side connectivity. The (flagc & 0x0c)=0x0c corresponds to the lower side connectivity and the right side connectivity. The (flagc & 0x09)=0x09 corresponds to the lower right side connectivity and the upper side connectivity.

Figure 21A:
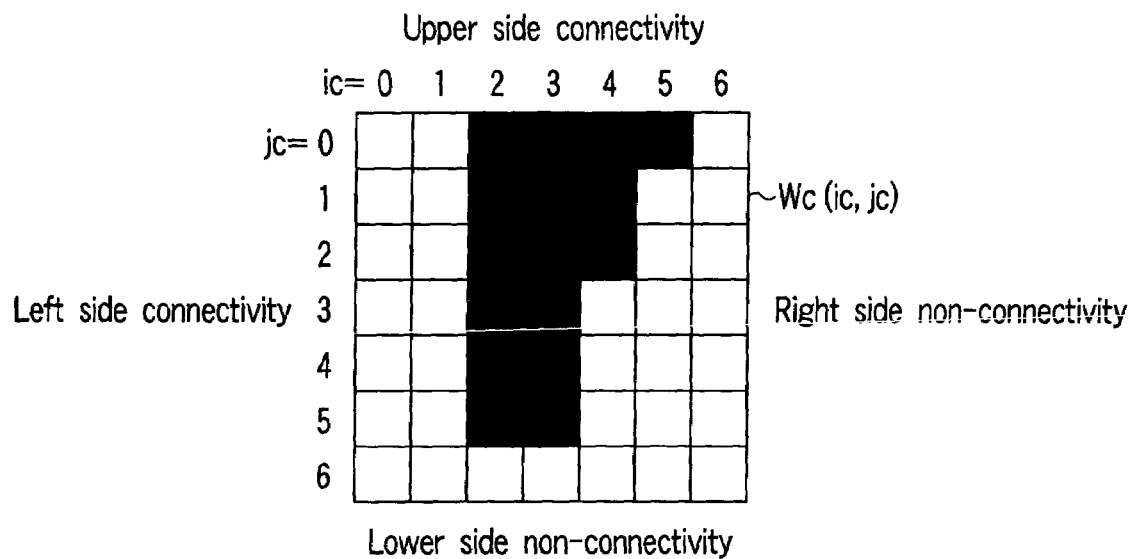
FIG. 21A is a view showing a case that a black pixel area is not connected to two sides orthogonal to each other in the processing windows.
Figure 21B:
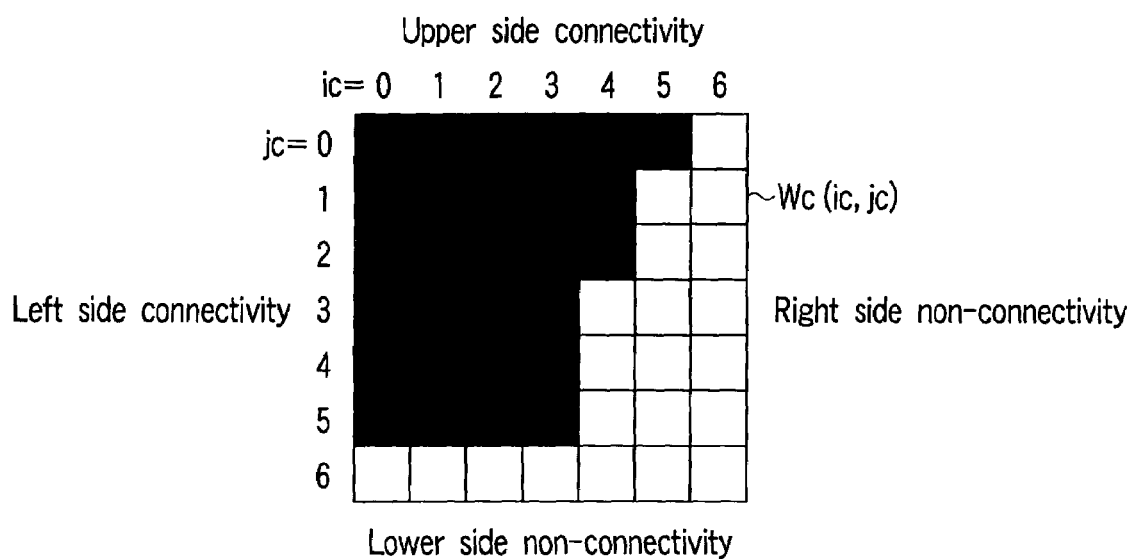
FIG. 21B is a view showing a case that a black pixel area is connected two sides orthogonal to each other in the processing window.

When only one of four sides of the rectangular processing window Wc (ic, jc) is connected, e.g., as shown in FIG. 21A, there is a case that the line width of the black pixels connected from the upper side in the vertical direction is only two dots at a narrow part. In such a case, the line may be blurred when the line thinning processing is applied to the black pixel areas. Thus, as described above, when the two sides of the rectangular processing windows Wc (ic, jc) orthogonal to each other are both connected, e.g., when the upper side and the left side are both connected as shown in FIG. 21B, a target is a solid which has a line width of not less than ½ of the size of the rectangular area.

When the connectivity is guaranteed in accordance with the judgment, the selective correction output portion 14 switches the selector 141, determines SELOUT=SFILOUT, and executes the processing to add the line thinning amount to the target pixel value in the addition portion 142. When the connectivity is not guaranteed in accordance with the judgment, the selective correction output portion 14 switches the selector 141, determines SELOUT=0, and does not execute the line thinning processing of the target pixel value in the addition portion 142.

As a result, for example, the line thinning processing is applied to only a solid including a thick line which has a line width of, e.g., ½ or above of a size of a rectangular area, and a thin line which has a width of one dot or two dots is not subjected to the line thinning processing and is outputted as it is. Therefore, it is possible to prevent blurring due to the excessive line thinning processing from being generated, thereby enabling the adaptive line thinning processing.

Incidentally, when the connectivity of the black pixel areas from the two sides of the rectangular processing window Wc (ic, jc) orthogonal to each other in the vertical direction is guaranteed, in the case of performing the line thinning in this manner, the vertical and horizontal sizes of the processing window Wc (ic, jc) become rough values of lower bounds of the vertical and horizontal sizes of the black pixel connected area.

FIFTH EMBODIMENT

A fifth embodiment will now be described. It is to be noted that like reference numerals denote parts equal to those in the third embodiment, thereby omitting the detailed explanation.

Figure 22:
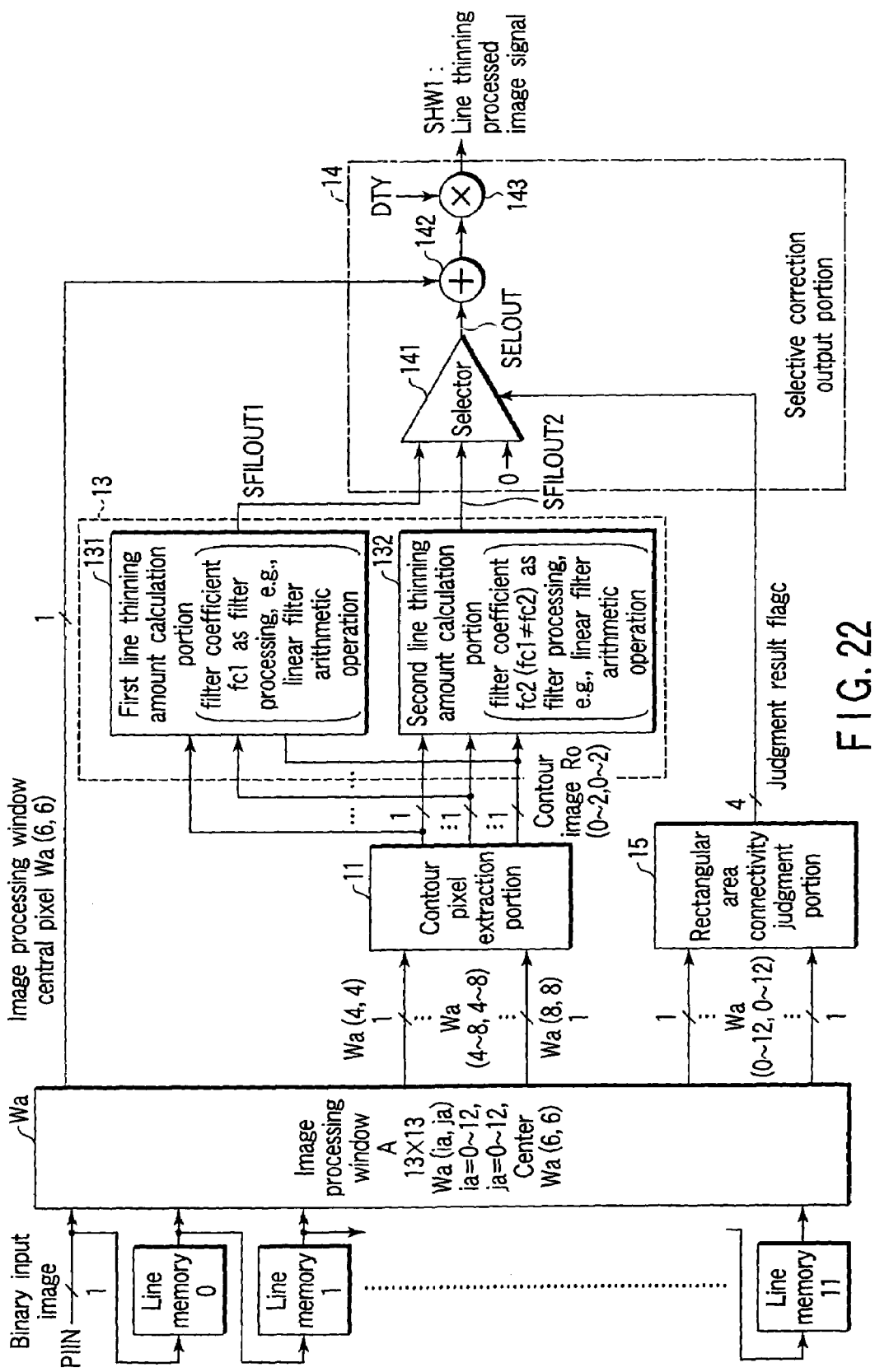
FIG. 22 is a schematic block diagram showing an image processing apparatus according to a fifth embodiment.

A difference from the third embodiment is that the line thinning amount calculation portion 13 is constituted by a first line thinning amount calculation portion 131 and a second line thinning amount calculation portion 132. As shown in FIG. 22, an output signal from the contour pixel extraction portion 11 is inputted to the first line thinning amount calculation portion 131 and the second line thinning amount calculation portion 132. Further, to the selector 141 are inputted a line thinning amount SFILOUT1 which is a filter arithmetic operation result outputted from the first line thinning amount calculation portion 131 and a line thinning amount SFILOUT2 which is a filter arithmetic operation result outputted from the second line thinning amount calculation portion 132.

Different filter coefficients fc1 and fc2 are respectively set in the first line thinning amount calculation portion 131 and the second line thinning amount calculation portion 132. For example, a filter coefficient represented by the following expression (16) is set in the first line thinning amount calculation portion 131.

$$fc1 = \begin{pmatrix} fc(0,0) & fc(0,1) & fc(0,2) \\ fc(1,0) & fc(1,1) & fc(1,2) \\ fc(2,0) & fc(2,1) & fc(2,2) \end{pmatrix} = \begin{pmatrix} 0 & 0 & 0 \\ 0 & -1.0 & 0 \\ 0 & 0 & 0 \end{pmatrix} \quad (16)$$

Also, a filter coefficient represented by the following expression (17) is set in the second line thinning amount calculation portion 132.

$$fc2 = \begin{pmatrix} fc(0,0) & fc(0,1) & fc(0,2) \\ fc(1,0) & fc(1,1) & fc(1,2) \\ fc(2,0) & fc(2,1) & fc(2,2) \end{pmatrix} = \begin{pmatrix} 0 & 0 & 0 \\ 0 & -0.75 & 0 \\ 0 & 0 & 0 \end{pmatrix} \quad (17)$$

It is to be noted that the filter coefficient set in the first line thinning amount calculation portion 131 increases a line thinning amount as compared with the filter coefficient set in the second line thinning amount calculation portion 132.

In the selective correction output portion 14, the selector 141 is switched in accordance with a judgment result flagc outputted from the rectangular area connectivity judgment portion 15. By switching the selector 141, any one of the line thinning amount SFILOUT1 outputted from the first line thinning amount calculation portion 131, the line thinning amount SFILOUT2 outputted from the second line thinning amount calculation portion 132, and "0" is outputted to the addition portion 142 as the final line thinning amount SELOUT.

For example when the judgment result flagc satisfies the connectivity on the two sides of the processing window Wc (ic, jc) orthogonal to each other, the selective correction output portion 14 switches the selector 141 and outputs the line thinning amount SFILOUT1 which is a calculation result of the filter coefficient whose line thinning amount is larger as SELOUT. In this case, in the addition portion 142, a target pixel value is subjected to the line thinning processing with a larger amount. When the judgment result flagc indicates the connectivity with respect to a side of the processing window Wc (ic, jc) but does not indicate the connectivity with respect to an orthogonal side, the selective correction output portion 14 switches the selector 141 and outputs as SELOUT the line thinning amount SFILOUT2, which is an arithmetic operation result of the filter coefficient that provides a smaller line thinning amount. In this case, in the addition portion 142, the target pixel value is subjected to line thinning with a smaller amount. When the judgment result flagc is 0, the selective correction output portion 14 switches the selector 141 and outputs SELOUT=0. In this case, line thinning of the target pixel value is not carried out in the addition portion 142. When the selector 141 is set to be switched in this manner, it is possible to execute the selective line thinning according to a solid type in the black pixel area in the processing window Wc (ic, jc).

SIXTH EMBODIMENT

A sixth embodiment will now be described. It is to be noted that like reference numerals denote parts equal to those in the third embodiment, thereby omitting the detailed explanation.

A difference from the third embodiment is that the line thinning amount calculation portion 13 is constituted by N portions, e.g., a first line thinning amount calculation portion 131, . . . , an N-th line thinning amount calculation portion 13N and the rectangular area connectivity judgment portion 15 is constituted by a first rectangular area connectivity judgment portion 151 and a second rectangular area connectivity judgment portion 152.

Figure 23:
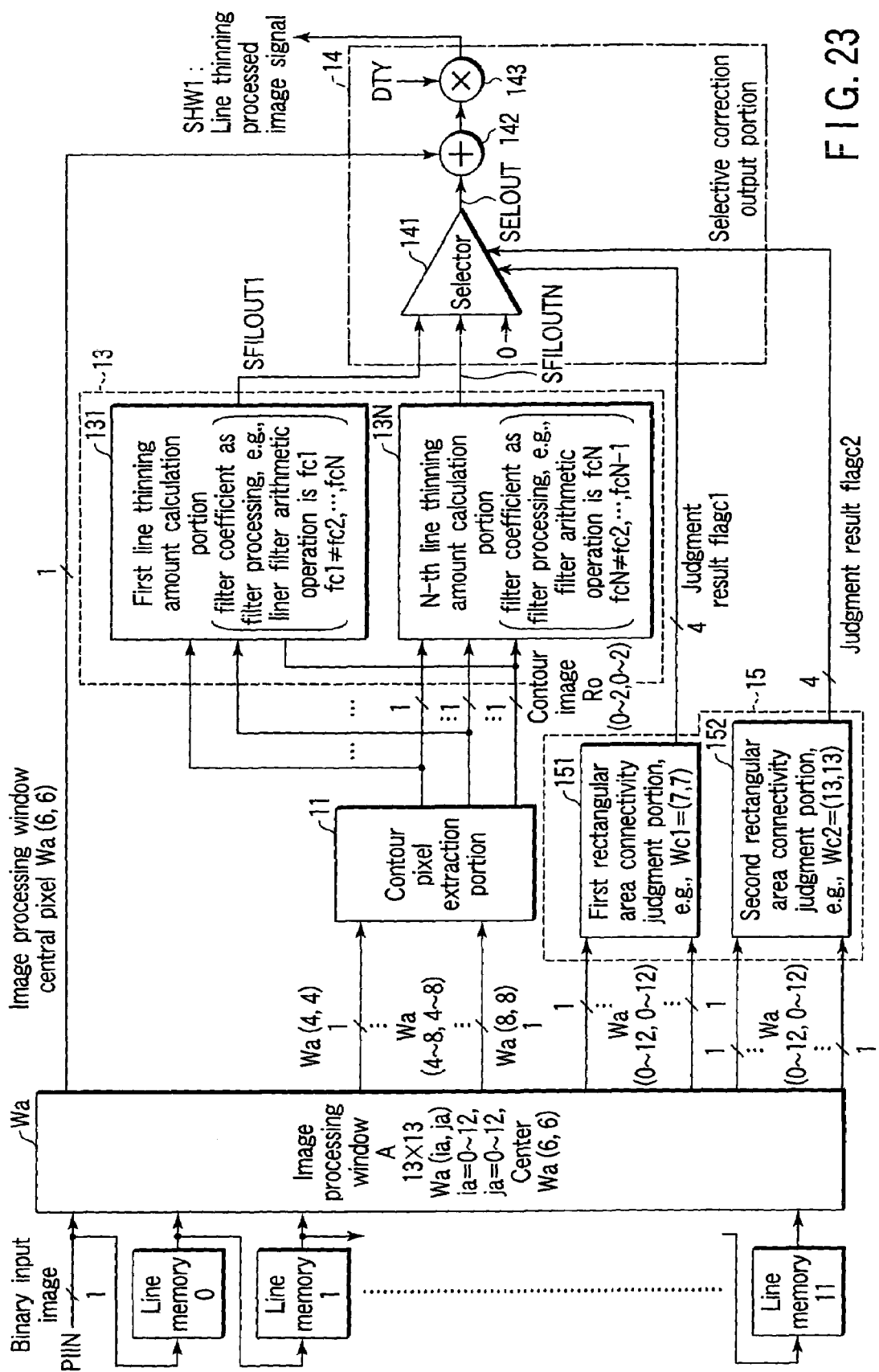
FIG. 23 is a schematic block diagram showing an image processing apparatus according to sixth embodiment.

As shown in FIG. 23, an output signal from the contour pixel extraction portion 11 is inputted to the first line thinning amount calculation portion 131 to the N-th line thinning amount calculation portion 13N. Further, different filter coefficients fc1, . . . , fcN are respectively set in the first line thinning amount calculation portion 131, . . . , the N-th line thinning amount calculation portion 13N, and a line thinning amount SFILOUT1, . . . , a line thinning amount SFILOUTN which are results of the different filter arithmetic operations are outputted to the selector 141. Furthermore, processing windows Wc (ic, jc) having different rectangular shapes are set to the first rectangular area connectivity judgment portion 151 and the second rectangular area connectivity judgment portion 152. For example, a processing window Wc1 (ic, jc) having 7×7 pixels is set to the first rectangular area connectivity judgment portion 151, and a processing window Wc2 (ic, jc) having 13×13 pixels is set to the second rectangular area connectivity judgment portion 152. Moreover, the judgment portion 151 outputs a judgment result flagc1 of the judgment upon the connectivity to the selective correction output portion 14, and the judgment portion 152 outputs a judgment result flagc2 of the judgment upon the connectivity to the same.

In the selective correction output portion 14, the selector 141 is switched in accordance with the judgment result flagc1 outputted from the judgment portion 151 and the judgment result flagc2 outputted from the judgment portion 152. By switching the selector 141, any one of the line thinning amount SFILOUT1 outputted from the first line thinning amount calculation portion 131, . . . , the line thinning amount SFILOUTN outputted from the N-th line thinning amount calculation portion 13N and "0" is outputted to the addition portion 142 as the final line thinning amount SELOUT.

For example, when the judgment result flagc2 of the second rectangular area connectivity judgment portion 152 with a larger rectangle satisfies the connectivity on the two sides of the processing window Wc (ic, jc) orthogonal to each other, the selective correction output portion 14 outputs as SELOUT the line thinning amount SFILOUT which is a calculation result of the line thinning amount calculation portion in which the filter coefficient with a larger line thinning amount is set. In this case, the target pixel value is subjected to the line thinning processing with a larger amount in the addition portion 142. When only the judgment result flagc1 of the first rectangular area connectivity judgment portion 151 having a small rectangle satisfies the connectivity on the two sides of the processing window Wc (ic, jc) orthogonal to each other, the selective correction output portion 14 switches the selector 141 and outputs as SELOUT the line thinning amount which is a calculation result of the line thinning amount calculation portion in which the filter coefficient which provides a smaller line thinning amount is set. In this case, the target pixel is subjected to the line thinning processing with a smaller amount in the addition portion 142. When the selector 141 is set to be switched in this manner, it is possible to execute the selective line thinning processing according to the dimension of a solid in the black pixel area in the processing window Wc (ic, jc).

SEVENTH EMBODIMENT

A seventh embodiment will now be described with reference to FIG. 24. FIG. 24 shows a structure of an image processing apparatus according to this embodiment. In FIG. 24, only the line thinning amount calculation portion 13 is illustrated in the image processing portion 100.

A multi-value image signal read in the image reading portion (e.g., a scanner) 101 is inputted to the first binarization processing portion 102 and a second binarization processing portion 103. The first binarization processing portion 102 and the second binarization processing portion 103 are configured to execute different types of binarization processing. Moreover, processed binary image signals are outputted to the selection output portion 104 from the respective processing portions 102 and 103. The selection output portion 104 selects one of the two binary image signals inputted thereto, and outputs it to the image processing portion 100. In addition, a mode setting portion (e.g., a control panel) 105 executes setting of a mode of the binary image signal outputted from the selection output portion 104 and setting of a parameter of the line thinning amount calculation portion based on a mode. For example, if the mode setting portion 105 sets a mode 0, the selection output portion 104 selects and outputs the image signal processed by the first binarization processing portion 102. If the mode setting portion 105 sets a mode 1, the selection output portion 104 selects and outputs the image signal processed by the second binarization processing portion 103. In addition, a parameter calculated in the line thinning amount calculation portion 13 is set in accordance with a mode set by the mode setting portion 105. As described above, the image processing apparatus according to this embodiment changes the parameter of the line thinning amount calculation portion 13 in accordance with the mode in order to execute the line thinning processing.

As an example, it is determined that the first binarization processing portion 102 is a processing portion which processes a dot image consisting of 100 lines and the second binarization processing portion 103 is a processing portion which processes a dot image consisting of 150 lines. Additionally, assuming that an image read from the image reading portion 101 has 600 dpi, rectangular sizes required for the dot judgment are 7×7 and 5×5, respectively. Since the rectangular size differs in this manner, selecting the parameter of the rectangular size in accordance with the mode effectively enables the line thinning processing. As a result, when the rectangular size of 7×7 is applied to the dot image consisting of 150 lines, thick lines detected in the rectangular sizes 5×5 and 6×6 are not subjected to the line thinning, and hence the effect of the line thinning is reduced in some cases. However, this problem can be avoided in this embodiment.

A modification of the seventh embodiment will now be described. In this modification, the line thinning calculation portion 13 executes the line thinning processing based on the filter processing, and it is configured to change a filter coefficient in accordance with a mode set in the mode setting portion 105.

For example, it is assumed that the first binarization processing portion 102 executes the processing based on the error diffusion method and the second binarization processing portion 103 executes the processing of a dot image consisting of 150 lines. Since the contour pixels tend to be disconnected when the error diffusion method is used, a filter coefficient which is distributed in a wide range is used. Since the contour pixels are aligned when the processing of the dot image consisting of 150 lines is used, a filter coefficient which is distributed in a narrow range is used. The smooth line thinning can be carried out by selecting a filter coefficient in accordance with each mode.

Another modification of the seventh embodiment will now be described. In this modification, the first binarization processing portion 102 executes the processing based on the error diffusion method, and the line thinning amount calculation portion 13 performs the line thinning processing based on the filter processing. Further, a gain of a first filter coefficient in a mode that the binary image signal processed in the first binarization processing portion 102 is outputted from the selection output portion 104 is set weaker than a gain of a second filter coefficient in a mode that the binary image signal processed in the second binarization processing portion 103 is outputted from the selection output portion 104. That is, in the mode that the binary image signal subjected to the error diffusion processing is outputted from the selection output portion 104, the gain of the filter is reduced. Since the contour pixels tend to be disconnected when the error diffusion method is used, when the filter coefficient is set stronger, a texture inherent to the error diffusion processing becomes prominent in some cases. Therefore, the gain of the filter can be reduced, the line thinning amount can be decreased, and the noise caused due to the texture can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus, comprising:
a contour pixel extraction portion which extracts a contour pixel of a binary input image signal;
a line thinning amount calculation portion which calculates a line thinning amount from the extracted contour pixel based on a preset parameter;
a finite area connectivity judgment portion which judges that black pixel areas are connected when only one black area in which a plurality of black pixels of the binary input image signal are disposed in a state connected to each other is formed in a finite area including a target pixel; and
a selective correction output portion which adds the line thinning amount to the binary input image signal of the target pixel when the finite area connectivity judgment portion judges that the black pixel areas are connected.

2. The image processing apparatus according to claim 1, wherein the line thinning amount calculation portion executes a linear filter arithmetic operation with respect to the contour pixel extracted by the contour pixel extraction portion, and performs a calculation.

3. The image processing apparatus according to claim 1, wherein, when it is determined that the black pixel areas are connected, the finite area connectivity judgment portion judges whether the black pixel areas are in contact with a boundary of the finite area.

4. An image processing apparatus, comprising:
a contour pixel extraction portion which extracts a contour pixel of a binary input image signal;
a line thinning amount calculation portion which calculates a line thinning amount from the extracted contour pixel based on a preset parameter;
a rectangular area connectivity judgment portion which judges that the black pixel areas are connected when only one black area in which a plurality of black pixels of the binary input image signal are disposed in a state connected to each other is formed in a finite area including a target pixel, the black area is connected with any one of an upper side, a left side, a lower side, and a right side which are parts of a boundary of a rectangular area, and the black pixels are continuously arranged on the one side in a vertical direction starting from a point on the one side; and
a selective correction output portion which adds a line thinning amount to the binary input image signal of the target pixel when the rectangular area connectivity judgment portion judges that the black pixel areas are connected.

5. The image processing apparatus according to claim 4, wherein the line thinning amount calculation portion executes a linear filter arithmetic operation with respect to the contour pixel extracted by the contour pixel extraction portion, and carries out a calculation.

6. The image processing apparatus according to claim 4, wherein vertical and horizontal sizes of the rectangular area are larger than a cycle of dots which are not subjected to line thinning.

7. The image processing apparatus according to claim 4, wherein vertical and horizontal sizes of the rectangular area are larger than a width of lines which are not subjected to line thinning.

8. The image processing apparatus according to claim 4, wherein the line thinning amount calculation portion comprises a first line thinning amount calculation portion and a second line thinning calculation portion to which different parameters are set in order to calculate line thinning amounts, and the selective correction output portion selectively adds a line thinning amount calculated in the first line thinning amount calculation portion or the second line thinning amount calculation portion to the binary input image signal of the target pixel.

9. The image processing apparatus according to claim 4, wherein the rectangular area connectivity judgment portion comprises a first rectangular area connectivity judgment portion and a second rectangular area connectivity judgment portion which judge whether the black pixel areas are connected in rectangular areas having different sizes, the line thinning amount calculation portion comprises a plurality of line thinning amount calculation portions to which different parameters are set, and the selective correction output portion selectively adds a line thinning amount calculated in each of a plurality of the line thinning amount calculation portions to the binary input image signal of the target pixel in accordance with the judgments of the first connectivity judgment portion and the second connectivity judgment portion.

10. The image processing apparatus according to claim 4, wherein the rectangular area connectivity judgment portion further judges whether the black pixel areas are connected with the judged one side and any one side orthogonal to the judged one side in the vertical direction.

11. The image processing apparatus according to claim 10, wherein the line thinning amount calculation portion executes a linear filter arithmetic operation with respect to the contour pixel extracted by the contour pixel extraction portion, and performs a calculation.

12. The image processing apparatus according to claim 10, wherein vertical and horizontal sizes of the rectangular area are larger than a cycle of dots which are not subjected to line thinning.

13. The image processing apparatus according to claim 10, wherein vertical and horizontal sizes of the rectangular area are larger than a width of lines which are not subjected to line thinning.

14. The image processing apparatus according to claim 10, wherein the line thinning amount calculation portion comprises a first line thinning amount calculation portion and a second line thinning calculation portion to which different parameters used to calculate line thinning amounts are set, and the selective correction output portion selectively adds a line thinning amount calculated in the first line thinning amount calculation portion or the second line thinning calculation amount to the binary input image signal of the target pixel.

15. The image processing apparatus according to claim 10, wherein the rectangular area connectivity judgment portion comprises a first rectangular area. connectivity judgment portion and a second rectangular area connectivity judgment portion which judge whether the black pixel areas are connected in rectangular areas having different sizes, the line thinning amount calculation portion comprises a plurality of line thinning amount calculation portions to which different parameters are set, and the selective correction output portion selectively adds a line thinning amount calculated in each of a plurality of the line thinning amount calculation portions to the binary input image signal of the target pixel in accordance with the judgments of the first connectivity judgment portion and the second connectivity judgment portion.

16. The image processing apparatus according to claim 4 further comprising:
- a first binarization processing portion which binarizes an inputted multi-value image signal;
- a second binarization processing portion which binarizes an inputted multi-value image signal;
- a mode setting portion which performs setting of a mode; and
- a selection output portion which selectively outputs the binary image signal processed in the first binarization processing portion or the second binarization processing portion in accordance with the mode,
- wherein the mode setting portion changes the parameter to be used in the line thinning amount calculation portion in accordance with the mode.

17. The image processing apparatus according to claim 5, further comprising:
- a first binarization processing portion which binarizes an inputted multi-value image signal;
- a second binarization processing portion which binarizes an inputted multi-value image signal;
- a mode setting portion which performs setting of a mode; and
- a selection output portion which selectively outputs the binary image signal processed in the first binarization processing portion or the second binarization processing portion in accordance with the mode,
- wherein the mode setting portion changes a filter coefficient of a filter arithmetic operation used in the line thinning amount calculation portion in accordance with the mode.

18. The image processing apparatus according to claim 17, wherein the first binarization processing portion executes error diffusion processing, and
- the mode setting portion sets a gain of a first filter coefficient in a mode that the binary image signal processed in the first binarization processing portion is outputted from the selection output portion to be weaker than a gain of a second filter coefficient in a mode that the binary image signal processed in the second binarization processing portion is outputted from the selection output portion.

19. An image processing method, comprising:
- extracting a contour pixel of a binary input image signal;
- calculating a line thinning amount from the extracted contour pixel based on a preset parameter;
- judging that black pixel areas are connected when only one black area in which a plurality of black pixels of the binary input image signal are disposed in a state connected to each other is formed in a finite area including a target pixel; and
- adding the line thinning amount to the binary input image signal of the target pixel when it is judged that the black pixel areas are connected.

20. The image processing method according to claim 19, wherein the line thinning amount is calculated by performing a linear filter arithmetic operation with respect to the extracted contour pixel.

21. The image processing method according to claim 19, further comprising:
- judging whether the black pixels are connected; and
- judging whether the black pixel areas are in contact with a boundary of the finite area,
- wherein the judgment to add the line thinning amount to the binary input image signal of the target pixel and output a obtained result is a judgment upon whether the black pixel areas are connected and a judgment upon whether the black pixel areas are in contact with the boundary.

22. The image processing method according to claim 19, wherein the finite area is a rectangular area, and the judgment upon whether the black pixel areas of the binary input image signal are connected judges that the black pixel areas are connected when only one black area in which a plurality of black pixels of the binary input image signal are continuously arranged in a connected state is formed in a finite area including a target pixel, the black area is connected with one of an upper side, a left side, a lower side and a right side which are parts of the boundary of the rectangular area, and the black pixels are continuously disposed on the one side in a vertical direction with a pixel point on the connecting side as a base point.

23. The image processing method according to claim 22, wherein the judgment upon the connectivity further judges whether the black pixel areas are connected with the judged one side and any one side orthogonal to the judged one side in the vertical direction.

* * * * *